United States Patent [19]

Woo

[11] Patent Number: 5,386,370
[45] Date of Patent: Jan. 31, 1995

[54] METHOD AND PARALLEL PROCESSOR COMPUTING APPARATUS FOR DETERMINING THE THREE-DIMENSIONAL COORDINATES OF OBJECTS USING DATA FROM TWO-DIMENSIONAL SENSORS

[75] Inventor: Steven C. Woo, Monterey Park, Calif.

[73] Assignee: Hughes Aircraft Company, Los Angeles, Calif.

[21] Appl. No.: 124,416

[22] Filed: Sep. 21, 1993

Related U.S. Application Data

[63] Continuation of Ser. No. 736,377, Jul. 19, 1991, abandoned.

[51] Int. Cl.⁶ .............................................. G01S 13/42
[52] U.S. Cl. ..................... 364/516; 364/449; 364/458; 364/460; 342/126; 342/357; 342/463
[58] Field of Search .............. 364/516, 449, 458, 460; 235/400, 411; 342/126, 356, 363, 357, 463, 464, 465, 451

[56] References Cited

U.S. PATENT DOCUMENTS

| | | | |
|---|---|---|---|
| 4,806,936 | 2/1989 | Williams et al. | 342/106 |
| 5,008,542 | 4/1991 | Bertrand et al. | 250/342 |
| 5,051,751 | 9/1991 | Gray | 342/107 |
| 5,170,484 | 12/1992 | Grondalski | 395/800 |

Primary Examiner—Emanuel T. Voeltz
Assistant Examiner—Jae H. Choi
Attorney, Agent, or Firm—W. K. Denson-Low

[57] ABSTRACT

First and second passive sensors (14,16), which may be mounted on different earth orbiting satellites, provide relative azimuth and elevation coordinates to sensed objects (A,B,C) such as hostile missiles. Minimum and maximum possible ranges to the objects (A,B,C) along lines-of-sight (18a,18b,18c) from the first sensor (14) are predetermined, and used to calculate "range lines" (24,26,28) which are coincident with the lines-of-sight (18a,18b,18c) and extend from the respective minimum to maximum ranges respectively. The range lines (24,26,28) are transformed into the field of view of the second sensor (16), and matched to the azimuth and elevation coordinates of the respective objects (A,B,C) using a basic feasible solution (greedy) or global optimization algorithm. The approximate points of intersection of lines-of-sight (20a,20b,20c) from the second sensor (16) to the objects (A,B,C) and matched range lines (24,26,28) are calculated, and transformed into coordinates relative to a reference point (10) such as the center of the earth (12). The calculations for the individual objects (A,B,C) may be performed simultaneously using parallel processors (44a,44b,44c) in a single instruction stream—multiple data stream (SIMD) or similar computing arrangement (40).

17 Claims, 6 Drawing Sheets

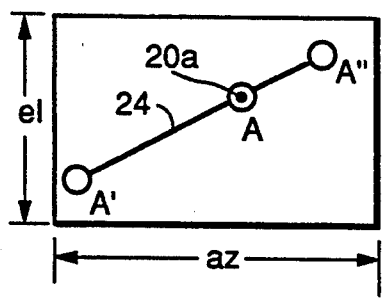
FIG. 4.
SENSOR 2
FIELD OF VIEW
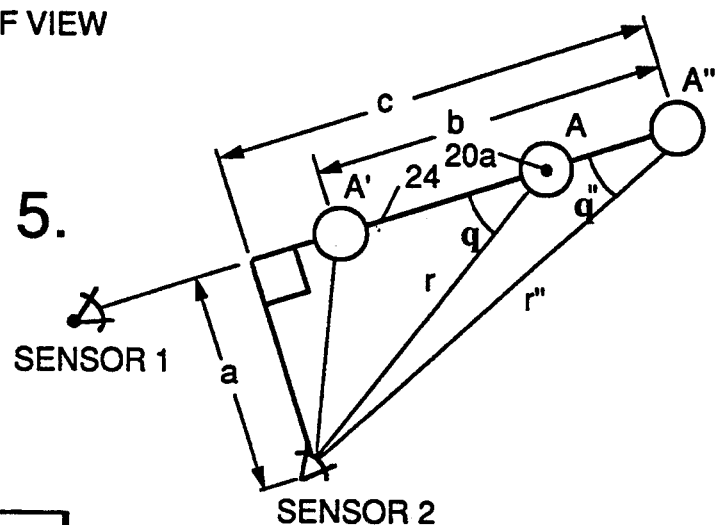
FIG. 5.
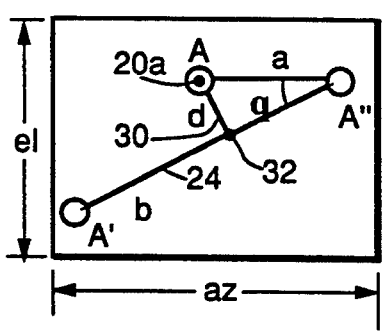
FIG. 6.
SENSOR 2
FIELD OF VIEW
FIG. 7.
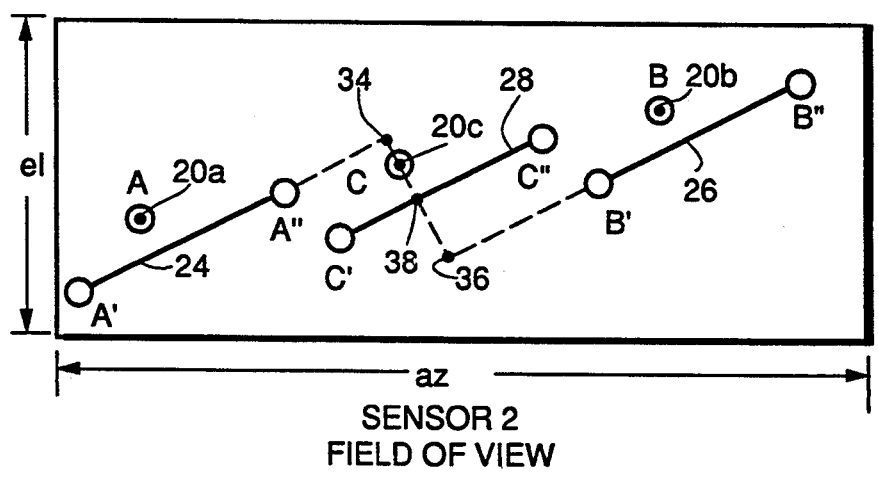
SENSOR 2
FIELD OF VIEW

METHOD AND PARALLEL PROCESSOR COMPUTING APPARATUS FOR DETERMINING THE THREE-DIMENSIONAL COORDINATES OF OBJECTS USING DATA FROM TWO-DIMENSIONAL SENSORS

GOVERNMENT RIGHTS

This invention was made with Government support under Contract No. DASG60-88-C-0111 awarded by the Department of the Army. The Government has certain rights in this invention.

This is a continuation of application Ser. No. 07/736,377, filed Jul. 19, 1991, now abandoned.

BACKGROUND OF THE INVENTION

1. Field of the Invention

The present invention provides a method and apparatus for determining the three-dimensional positions of objects based on two-dimensional (azimuth and elevation) coordinates from two separate passive sensors.

2. Description of the Related Art

Determining the three-dimensional position of a target object such as an aircraft or missile using active radar is a straightforward process. Azimuth and elevation coordinates (two dimensions) are provided by the radar's antenna scanning system. The range to the object, which constitutes the third coordinate, is provided by measuring the time-of-flight of radio frequency pulses transmitted toward and reflected back from the object. The three-dimensional coordinates of the object relative to a particular reference point, such as the center of the earth, may be easily derived using simple coordinate transformations since the position of the radar relative to the reference point is known.

However, tracking of objects such as hostile missiles using data from sensors mounted on orbiting satellites is much more difficult, since these sensors are conventionally passive and provide only relative azimuth and elevation coordinates. Lines-of-sight from two or more sensors can be triangulated to derive a third coordinate for target position determination. However, where a significant number of objects are being tracked, multiple lines-of-sight intersect at points where no objects actually exist. A method must therefore be provided to eliminate the false intersections from further consideration and match the lines-of-sight from the respective sensors to the individual objects.

U.S. Pat. No. 4,806,936, entitled "METHOD OF DETERMINING THE POSITION OF MULTIPLE TARGETS USING BEARING-ONLY SENSORS" issued Feb. 21, 1989, to Patrick R. Williams, assigned to the Hughes Aircraft Company, the assignee of the patent as well as the present application, described a "deghosting algorithm". The positions of a plurality of targets are located using three or more sensors such as jammed radars which sense only the azimuth or bearing angle to the targets. The intersecting bearing lines form triangles representing both true targets and false or "ghost" targets. The false target triangles are separated from the true target triangles by analyzing the size and position of each triangle. Bearing data defining the triangles is first ordered, and then sequentially examined in a manner such that a first group of false targets is eliminated from consideration. The bearing data defining the remaining triangles is processed through coarse and fine gates to eliminate the second and third groups of false targets. A fourth group of false targets is eliminated by using a global maximum likelihood procedure, in which a likelihood function is maximized through the use of discrete optimization techniques.

In the worst case using the deghosting method for n targets, $n^3$ candidate target locations must be searched in order to determine the actual locations of the objects. In addition, the search algorithm utilizes an exhaustive search procedure which has an overall complexity of $n^{2n}$ for n targets. In a realistic defense scenario in which hundreds or more missiles must be tracked simultaneously, such a search using even the most current computer technology would require a length of time greatly in excess of the time-of-flight of the missiles.

SUMMARY OF THE INVENTION

In accordance with the present invention, first and second passive sensors, which may be mounted on different earth orbiting satellites, provide relative azimuth and elevation coordinates to sensed objects such as hostile missiles. Minimum and maximum possible ranges to the objects along lines-of-sight from the first sensor are predetermined, and used to calculate "range lines" which are coincident with the lines-of-sight and extend from the respective minimum to maximum ranges respectively. The range lines are transformed into the field of view of the second sensor, and matched to the azimuth and elevation coordinates of the respective objects using a basic feasible solution (greedy) or global optimization algorithm. The approximate points of intersection of lines-of-sight from the second sensor to the objects and matched range lines are calculated, and transformed into coordinates relative to a reference point such as the center of the earth. The calculations for the individual targets may be performed simultaneously using parallel processors in a single instruction stream—multiple data stream (SIMD) or similar computing arrangement.

The present method may utilize a global optimization algorithm such as the Munkres Assignment Problem Algorithm (Hungarian Method) for matching the lines-of-sight from two sensors to the individual targets. This type of coordinate determination requires that only $n^2$ candidate locations be searched. The overall complexity of the search algorithm is $n^3$, which is much smaller than that of the deghosting algorithm. Alternatively, a basic feasible solution or "greedy" algorithm may be used which also requires that $n^2$ candidate locations be searched, but the overall complexity of the algorithm is also $n^2$. In this implementation, where coordinate determination may not be globally optimal, the search through the candidate locations may be performed simultaneously using parallel processors. With a group of n processors, the complexity of the search algorithm is n.

In addition to tracking missiles or other objects in space, the present invention is suitable for applications such as vision problems which require that the three-dimensional location of objects be determined based on multiple two-dimensional views of the objects. Examples of such applications are robotics and machine vision. The process of determining the location of objects such as obstructions can be very time-consuming and delay the progress of a robot. Because the present invention can utilize a greedy assignment algorithm capable of being performed in parallel, the determination of object locations can be performed significantly faster.

DESCRIPTION OF THE DRAWINGS

FIG. 4 is a diagram illustrating the object and range line for the object as transformed into the field of view of the second sensor;

FIG. 5 is a diagram illustrating the geometric relationship between the two sensors, object, and range line for determining the three dimensional position of the object;

FIG. 6 is a diagram illustrating the geometric relationship between the object and the range line which is displaced from the object due to inherent system errors;

FIG. 7 is a diagram illustrating the matching of objects to range lines;

DETAILED DESCRIPTION OF THE INVENTION

Figure 1:
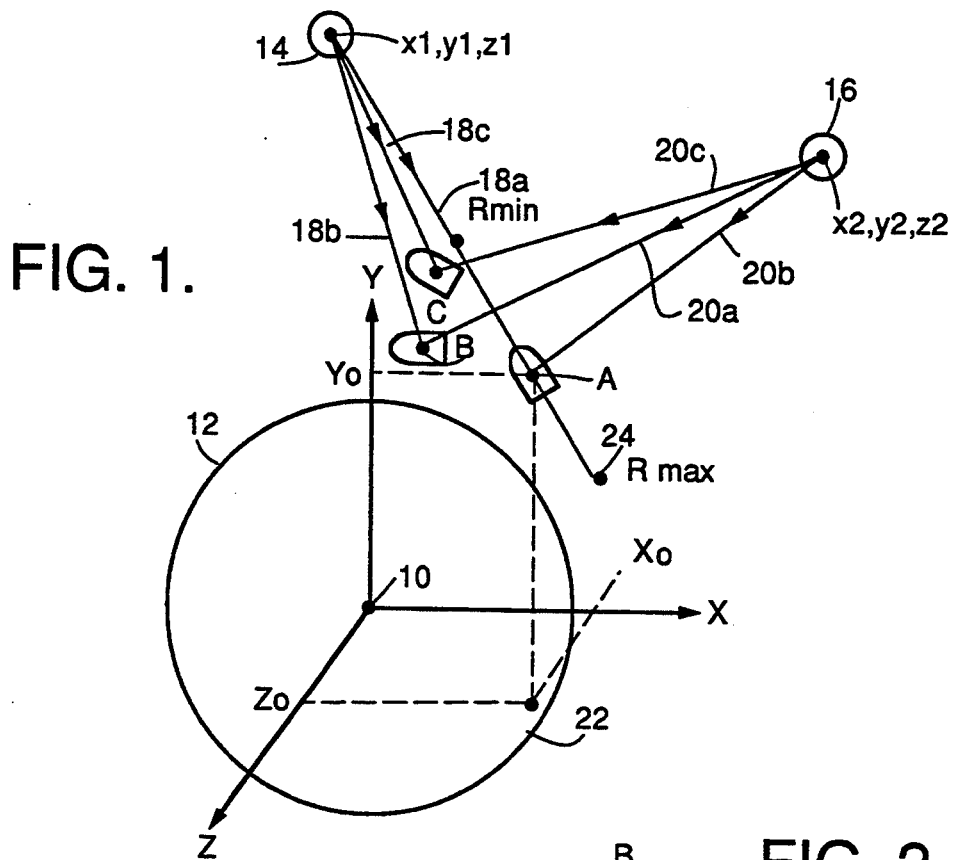
FIG. 1 is a diagram illustrating an orthogonal coordinate system, two sensors and three target objects for explaining the principles of the present invention.

FIG. 1 illustrates an overview of the geometric problem which is solved by the present method. A three-dimensional orthogonal coordinate system is shown as having an origin 10 located, for example, at the center of the earth as designated at 12. The orthogonal coordinate system has X, Y and Z axes. The origin 10 is considered to be a reference point relative to which the three-dimensional positions as expressed in three orthogonal coordinates x, y, and z of three objects such as hostile missiles A, B and C are to be determined. Although only three objects are shown in the drawing, hundreds or more of such objects may be present in a realistic defense scenario, the three-dimensional positions of which must be quickly determined and tracked.

The objects A, B and C are sensed by first and second sensors (sensor 1 and sensor 2) 14 and 16 respectively, which are shown as being integral elements of satellites in orbit (moving or stationary) above the earth 12. The sensors 14 and 16 are passive units such as television or thermal cameras which provide only two-dimensional angular coordinate data in the form of azimuth (az) and elevation (el) angles relative to themselves. The azimuth and elevation coordinates define lines-of-sight $18a$, $18b$ and $18c$ from the sensor 14 to the respective objects A, B and C, and lines-of-sight $20a$, $20b$ and $20c$ from the sensor 16 to the objects A, B and C respectively.

Figure 2:
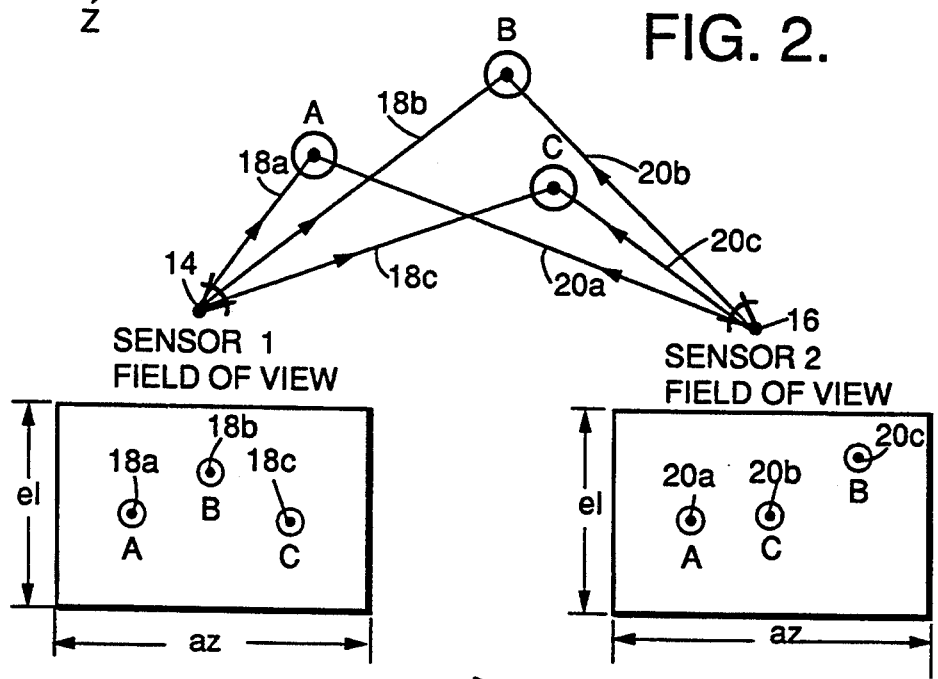
FIG. 2 is a diagram illustrating the three objects as appearing in the fields of view of the two sensors.

The three-dimensional coordinates of the object A are shown as being projected on the X, Y and Z axes and designated as $x_0$, $y_0$ and $z_0$ respectively, with the projection of the object A on a plane defined by the X and Z axes being designated as 22. The x,y,z coordinates of the objects B and C are not shown in the drawing for simplicity of illustration. The three-dimensional coordinates of the sensors 14 and 16 relative to the origin 10 are known, and designated as $x_1,y_1,z_1$ and $x_2,y_2,z_2$ respectively. These geometric relationships are further illustrated in FIG. 2 from the fields of view of the sensors 14 and 16.

The present method may be performed sequentially (serially) or simultaneously (in parallel) for determining the positions of each of the objects A, B, and C. The basic procedure for one object A will be described first, followed by a description of how the processing for one object is related to that for the other objects. It will be noted that although the present method is especially suited for determining the positions of objects in three dimensions, a simplified version thereof can be applied to two-dimensional problems such as tracking surface targets where only the azimuth angles to the targets are known.

Figure 3:
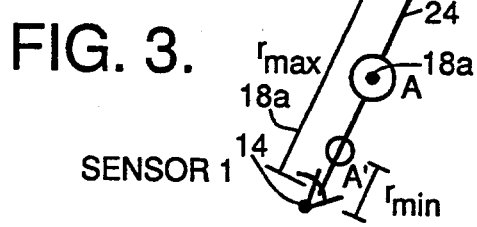
FIG. 3 is a diagram illustrating one of the objects and a range line established for the object relative to the first sensor.

The quantities which are known are the x,y,z coordinates of the sensors 14 and 16 relative to the origin 10, and the azimuth and elevation coordinates az,el of the objects relative to the sensors 14 and 16. As viewed in FIG. 2, the lines-of-sight from the sensors 14 and 16 to the respective objects extend perpendicular to the plane of the drawing, and are represented as points at the centers of small circles representing the respective objects. FIG. 3 illustrates the object A relative to the first sensor 14. The method of the invention determines the range from one of the sensors to the object A which, in combination with the az,el coordinates for the same sensor, specifies the position of the object in three dimensions.

In accordance with the invention, although the range to the object A is not known exactly, it will necessarily lie within certain minimum and maximum values depending on the particular application. For example, missiles launched from the Soviet Union toward the United States must remain further than a certain minimum range from the sensor 14 due to the altitude limitations of the particular missile, and within a certain maximum range since the missile must travel above the surface of the earth 12. Depending on the particular situation, a minimum range $r_{min}$ and a maximum range $r_{max}$ are predetermined. As shown in FIG. 3, these ranges $r_{min}$ and $r_{max}$ are plotted along the line-of-sight $18a$ from the sensor 14 and designated as endpoints A' and A" respectively of a "range line" 24 which is coincident with the line-of-sight $18a$. The object A lies on the range line 24 at an as yet unknown position between the endpoints A' and A".

The next step of the process is to transform the range line 24, and especially the coordinates of the endpoints A' and A" into the field of view of the second sensor 16. The transformed range line 24 is shown in FIG. 4 along with the line-of-sight $20a$ to the object A. The line-of-sight $20a$ as defined by the az,el coordinates relative to the second sensor 16 extends perpendicular to the plane of the drawing, and is represented by a point at the center of the object A. Where the positions of the sensors 14 and 16 and the az,el coordinates for the object A from both sensors 14 and 16 are known precisely, the line-of-sight 20a will lie exactly on the range line 24.

The object A is located at the intersection of the line-of-sight 20a and range line 24. In the field of view of the second sensor 16 as shown in FIG. 4, this intersection is equivalent to the position of the point representing the line-of-sight 20a on the range line 24. Since the range line 24 is defined by the known three-dimensional coordinates of the endpoints A' and A" and the azimuth and elevation of the line-of-sight 20a from the second sensor 16 are known, sufficient information is available to calculate the intersection of the line-of-sight 20a and range line 24 which specifies the position of the object A relative to the second sensor 16. The azimuth, elevation and range of the object A from the second sensor 14 specify the position of the object A in three dimensions relative thereto. These coordinates may be transformed into orthogonal x,y,z coordinates to provide the desired position of the object A relative to the origin 10.

For the derivation of the basic equations of the present method, it will be assumed that the x, y, and z coordinates of both sensors 14 and 16 are known exactly, and that the azimuth and elevation of all three targets A, B and C are known exactly within each sensors' field of view. The x, y, and z coordinates relative to the first sensor 14 represent the line-of-sight vector (los) from the sensor 14 to the object A. The components of the line-of-sight vector los shall be denoted as a, b, and c for the x, y, and z components, respectively. The velocity and position of the sensor 14 are required in order to derive these coordinates. The velocity components of the sensor 14 shall be denoted as $v_x$, $v_y$, and $v_z$ and the position components $x_1, y_1, z_1$ of the sensor 14 shall be redesignated as $p_x, p_y, p_z$ respectively. In addition, $<a,b>$ shall denote the inner (dot) product of the vectors a and b, and $a \times b$ shall denote the cross product of the vectors a and b. The basic equations to determine the coordinates of A' and A" are derived from three base equations:

$$\text{Azimuth} = \tan^{-1}\left[\frac{<vxp, los>}{<v, los>}\right] \quad (1)$$

$$\text{Elevation} = \tan^{-1}\left[\frac{\sqrt[2]{q - [<p, los>]^2\left[\frac{1}{r^2}\right]}}{-<p, los>\left[\frac{1}{r}\right]}\right] \quad (2)$$

$$a^2 + b^2 + c^2 = r^2 \quad (3)$$

Expanding equation (1) yields:

$$\tan(Azimuth)[v_x a + v_y b + v_z c] = [vxp_x a + vxp_y b + vxp_z c] \quad (4)$$

Where $vxp_x$, $vxp_y$, and $vxp_z$ represent the x, y, and z components of the vector equal to the cross product of the velocity vector and the position vector of the sensor 14, and r represents the range from the sensor 14 to A'($r_{min}$) or A"($r_{max}$), depending on which of the two points is being operated on.

By letting $d = \tan(Azimuth)$, equation (4) becomes:

$$[v_x ad + v_y bd + v_z cd] = [vxp_x a + vxp_y b + vxp_z c] \quad (5)$$

Expansion of equation (2) yields:

$$\tan(Elevation)\left[\frac{1}{r}\right][-p_x a - p_y b - p_z c] = \sqrt[2]{1 - [p_x a + p_y b + p_z c]^2\left[\frac{1}{r^2}\right]} \quad (6)$$

By letting $e = \tan(Elevation)$, equation (6) becomes:

$$[p_x a + p_y b + p_z c] = \sqrt[2]{\frac{r^2}{e^2 + 1}} \quad (7)$$

From equation (5):

$$a(v_x d - vxp_x) = b(vxp_y - v_y d) + c(vxp_z - v_z d)$$

$$a = b\left[\frac{(vxp_y - v_y d)}{(v_x d - vxp_x)}\right] + c\left[\frac{(vxp_z - v_z d)}{(v_x d - vxp_x)}\right]$$

Substituting:

$$f = \left[\frac{(vxp_y - v_y d)}{(v_x d - vxp_x)}\right] \quad g = \left[\frac{(vxp_z - v_z d)}{(v_x d - vxp_x)}\right]$$

yields $$a = bf + cg \quad (8)$$

From equation (7):

$$[p_x a + p_y b + p_z c] = \sqrt[2]{\frac{r^2}{e^2 + 1}}$$

by utilizing equation (8) and substituting $$a = bf + cg$$

equation (7) becomes:

$$p_x(bf + cg) + p_y b + p_z c = \sqrt[2]{\frac{r^2}{e^2 + 1}}$$

$$b(p_x f + p_y) + c(p_x g + p_z) = \sqrt[2]{\frac{r^2}{e^2 + 1}}$$

Substituting $$h = \left[\sqrt[2]{\frac{r^2}{e^2 + 1}}\right]$$

yields:

$$b(p_x f + p_y) + c(p_x g + p_z) = h$$

-continued $$b = \left[\frac{h - c(p_x g + p_z)}{p_x f + p_y}\right] \quad (9)$$

Substituting (9) into (8) yields:

$$a = \left[\frac{fh}{p_x f + p_y} - \frac{cf(p_x g + p_z)}{p_x f + p_y} + cg\right] \quad (10)$$

and by substituting:

$$j = \left[\frac{h}{p_x f + p_y}\right] \quad k = \left[\frac{p_x g + p_z}{p_x f + p_y}\right]$$

equations (9) and (10) become:

$$b = j - ck \quad (11)$$

$$a = fj + c(g - fk) \quad (12)$$

From (3):

$$a^2 + b^2 + c^2 = r^2$$

Substituting (11) and (12) yields:

$$[f^2 j^2 + 2fjc(g - fk) + c^2(g - fk)^2] + [j^2 - 2cjk + c^2 k^2] + c^2 = r^2$$

$$c^2[(g - fk)^2 + k^2 + 1] + c[2fj(g - fk) - 2jk] + [f^2 j^2 + j^2 - r^2] = 0$$

Substituting:

$$l = [(g - fk)^2 + k^2 + 1]$$

$$m = [2fj(g - fk) - 2jk]$$

$$n = [f^2 j^2 + j^2 - r^2]$$

yields:

$$lc^2 + mc + n = 0 \quad (13)$$

which is a quadratic equation in c. The solution to this quadratic is known to be:

$$c_{1,2} = -m \pm \frac{\sqrt[2]{m^2 - 4ln)}}{2l} \quad (14)$$

Equations (11), (12), and (14) yield the values for a, b, and c, the x, y, and z components of the line-of-sight vector from the sensor 14 to the points A' and A''. It is important to note that two values of c will result from (14). One of the two values that results will lead to a line-of-sight vector that is not in the field of view of the sensor 14. In order to determine which vector is not in the field of view of the sensor 14, both vectors are calculated and the inner product of each vector is taken with the velocity vector of sensor 14. The vector that is not in the field of view of the sensor 14 will give a negative inner product when this operation is performed.

In summary:

$$c_{1,2} = -m \pm \frac{\sqrt[2]{m^2 - 4ln)}}{2l}$$

$$b = j - ck$$

$$a = fj + c(g - fk)$$

where:

$$d = \tan(\text{Azimuth})$$

$$e = \tan(\text{Elevation})$$

$$f = \left[\frac{(v_x p_y - v_y d)}{(v_x d - v_x p_x)}\right]$$

$$g = \left[\frac{(v_x p_s - v_z d)}{(v_x d - v_x p_x)}\right]$$

$$h = \left[\sqrt[2]{\frac{r^2}{e^2 + 1}}\right]$$

$$j = \left[\frac{h}{p_x f + p_y}\right]$$

$$k = \left[\frac{p_x g + p_z}{p_x f + p_y}\right]$$

$$l = [(g - fk)^2 + k^2 + 1]$$

$$m = [2fj(g - fk) - 2jk]$$

$$n = [f^2 j^2 + j^2 - r^2]$$

By utilizing these equations, a, b, and c (the x, y, and z components of the line-of-sight vector from the sensor 14 to the points A' and A'') can be calculated. In order to determine the x, y, and z coordinates of A' and A'', the x, y, and z coordinates $p_x, p_y, p_z = x_1, y_1, z_1$ of the sensor 14 are added to a, b, and c, respectively. Thus:

$$A_{x'} = p_x + a_{A'} \quad A_{y'} = p_y + b_{A'} \quad A_{z'} = p_z + c_{A'}$$

$$A_{x''} = p_x + a_{A''} \quad A_{y''} = p_y + b_{A''} \quad A_{z''} = p_z + c_{A''}$$

Since the x, y, and z coordinates of the points A' and A'' are known, these points may be transformed into the field of view of the sensor 16 by applying the detection equations (1) and (2). The components of the line-of-sight vector los for the transformation are the x, y, and z distances from the sensor 16 to the points A' and A''. By using equations (1) and (2), the points A' and A'' can be transformed into the field of view of the sensor 16.

The geometry of the relationship between the positions of the sensors 14 and 16 and the points A', A'' and A is shown in FIG. 5, with the letters a, b, and c denoting different variables from those previously represented. The value of r, the range to point A, can be derived as follows.

From the definition of the inner product:

$$|r''| \, |b| \, \cos(\theta'') = <r'', b>$$

or $$\cos(\theta'') = \left[ \frac{<r'',b>}{\|r''\| \, \|b\|} \right]$$

where
r″ is the vector from point A″ to the sensor 16
b is the vector from point A″ to point A″
|r″| is the magnitude of the vector r″
|b| is the magnitude of the vector b
c=|r″| cos (θ″)

$$a = \sqrt[2]{\|r''\|^2 - c^2}$$

The value of a is easily determined, because all entities in the equations necessary to derive it are known. Similarly:

|r| |b| cos (θ)=<r,b> or $$\cos(\theta) = \left[ \frac{<r,b>}{\|r\| \, \|b\|} \right]$$

where
r is the vector from point A to the censor 16
b is the vector from point A″ to point A′
|r| is the magnitude of the vector r
|b| is the magnitude of the vector b The vector r can be calculated with the procedure outlined above for determining the line-of-sight vector assuming a nominal range. By picking a range of unity, a unit vector in the direction from the sensor 16 to point A can be calculated. By taking the opposite of each of the components of the line-of-sight vector calculated with the above procedure, the vector from point A to the sensor 16 can be calculated. After this vector is calculated, the value for cos(q) can easily be computed. From FIG. 5:

a=|r| sin (θ)

or $$\|r\| = \left[ \frac{a}{\sin(\theta)} \right] \quad (15)$$

From the trigonometric relation $\cos^2(\theta) + \sin^2(\theta) = 1$ we can see that $$\sin(\theta) = \sqrt[2]{1 - \cos^2(\theta)}$$

Since the value of cos(h) has been determined above, the value of sin(h) can easily be determined. Substituting the values for a and sin(h) into equation (15) will give the value for $\|r\|$, the range from the sensor 16 to the point A. Since the line-of-sight vector to point A was calculated in order to determine r, the range information is sufficient to specify the coordinates of A relative to the sensor 16. When these relative coordinates are added to the x, y, and z coordinates $(x_2, y_2, z_2)$ for the sensor 16, the absolute x, y, and z coordinates of the object A relative to the origin 10 are specified.

The steps presented above may be performed for each object in sequence, until the three-dimensional coordinates for all of the objects relative to the origin 10 have been determined, assuming no sensor registration error and no azimuth-elevation reporting error. However, if such errors are present, the lines-of-sight and range lines in the field of view of the second sensor 16 will be displaced from each other as illustrated in FIGS. 6 and 7, and a method must be provided for matching the objects to the respective range lines.

Where such errors are present, the steps for the basic method are followed until the points A′ and A″ are translated into the field of view of the second sensor 16. Instead of having the points A′, A″, and A collinear, registration error and azimuth-elevation reporting error will result in the translation of these points as shown in FIG. 6. It can be seen that there is some small distance d that separates object A from the range line 24 defined by the endpoints A′ and A″. In this version of the present method, all of the range lines from the first sensor 14 are calculated and transformed into the field of view of the second sensor 16. The resulting field of view for the sensor 16 is shown in FIG. 7.

Figure 8:
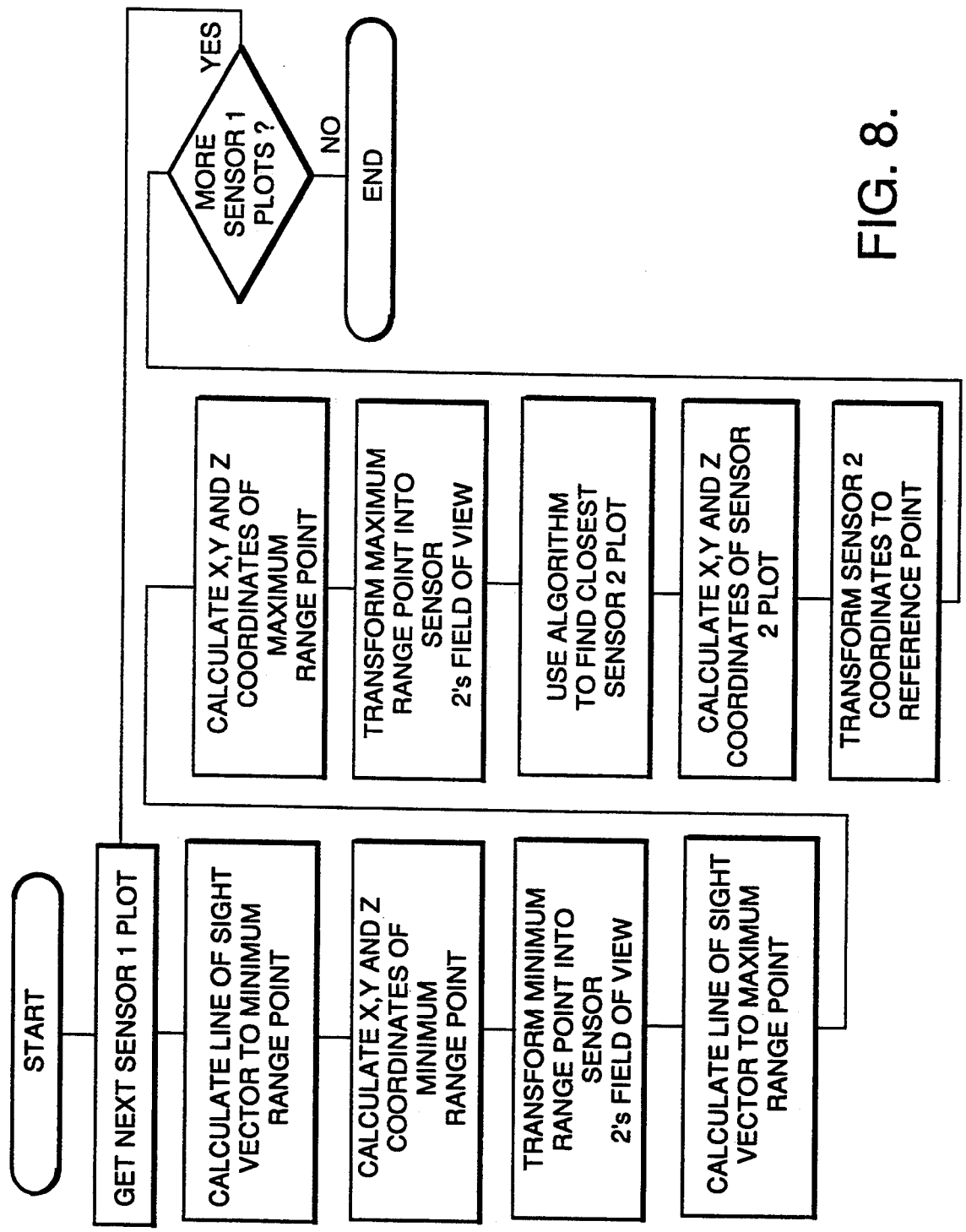
FIG. 8 is a flowchart illustrating the method of the invention as performed sequentially for a plurality of objects.

A flowchart of the present method including the step of matching the objects to the range lines is presented in FIG. 8. The problem requires globally matching the line-of-sight points 20a, 20b and 20c representing the objects A, B, and C to respective range lines 24, 26 and 28. The range lines 26 and 28 are defined by minimum and maximum endpoints B′,B″ and C′,C″ respectively. This type of problem may be solved using various assignment problem algorithms. One type of algorithm is known as the Munkres Assignment Problem Algorithm (Hungarian Method) which is described in a textbook entitled "OPERATIONS RESEARCH, APPLICATIONS AND ALGORITHMS", by W. Winston, PWS-KENT Publishing Company, 1991, pp. 358–363. In this method, "costs" are computed by assigning the sets of az,el coordinates or plots 20a, 20b and 20c for the objects A, B and C to each of the range lines 24, 26 and 28. A one-to-one assignment of plots to range lines is made by this algorithm such that the overall total cost of assigning plots to range lines is a global minimum. Thus, the globally optimum assignment of plots to range lines is made. It should be noted that this algorithm requires that $n^2$ candidate assignments be searched, requiring $n^3$ operations in the worst case.

A basic feasible solution (greedy) algorithm that does not ensure one-to-one assignment also requires that $n^2$ candidate assignments be searched, but requires only $n^2$ operations, thus saving a significant amount of time on larger problems. In addition, this algorithm may be performed in parallel using a set of n processors, and has a complexity of n. A flowchart of the method for matching objects to range lines using the greedy algorithm is presented in FIG. 9.

The computation of cost factors for the global optimization method or a comparison parameter for the greedy algorithm is done by taking the perpendicular distance from each line-of-sight to each range line. In FIG. 6, the perpendicular distance d is computed for each plot to each range line in the same manner as the value of a was calculated using equation (15) with reference to FIG. 5 in order to determine the value of $\|r\|$.

In a case where the line-of-sight and range line do not intersect exactly, an approximate point of intersection is defined for the purpose of calculating the range from the sensor 16 to the object. As viewed in FIG. 6, the distance d is measured along a line 30 which is perpendicular to both the line-of-sight 20a (which extends perpendicular to the plane of the drawing) and the range line 24, and intersects the respective lines at points where the lines are closest to each other. The intersection of the perpendicular line 30 with the range line 24 defines a point 32 which is used to approximate the point of intersection of the lines 20a and 24 for the purpose of calculating the range from the second sensor 16 to the object A as described with reference to FIG. 5.

Figure 9:
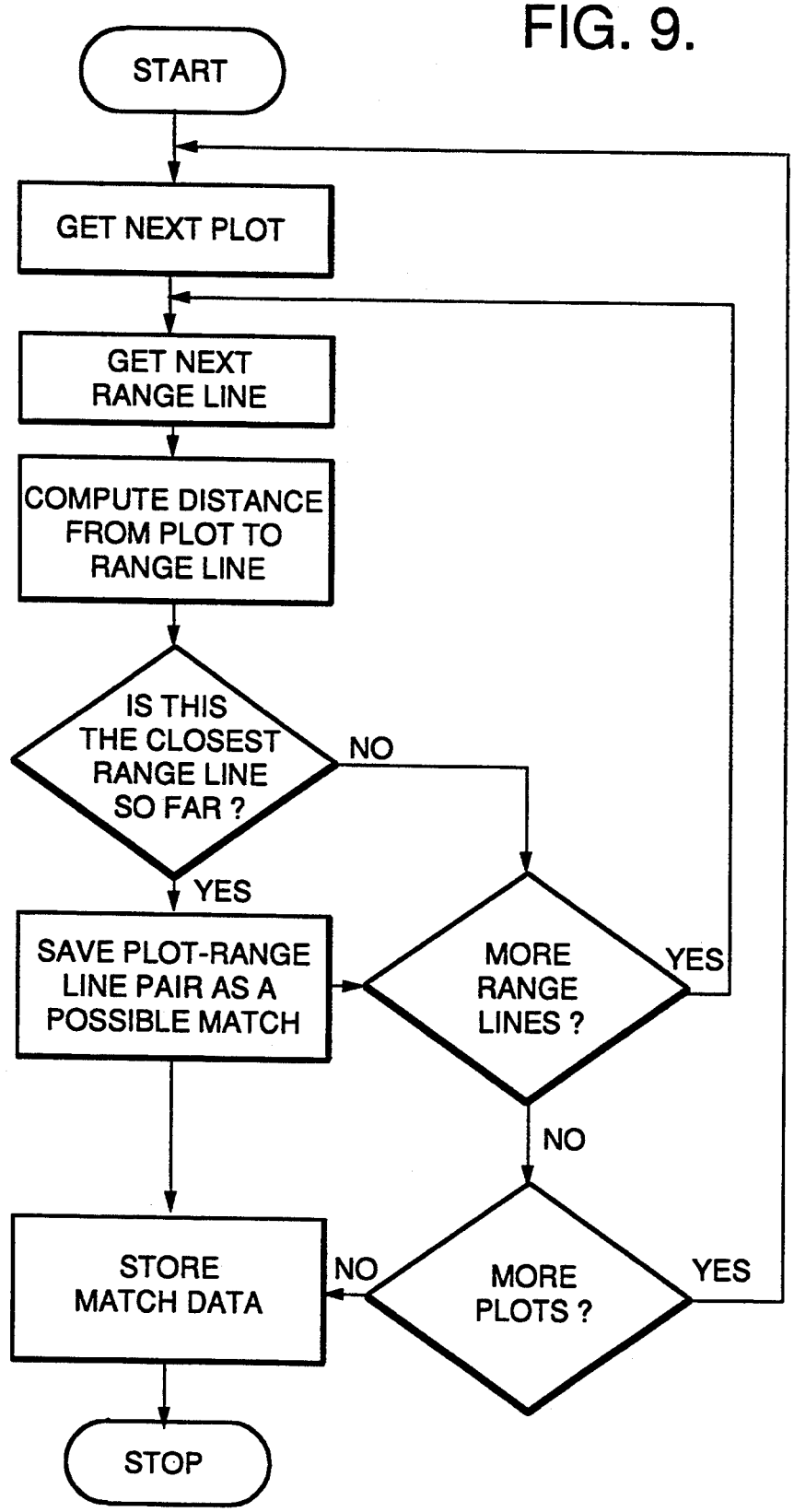
FIG. 9 is a flowchart illustrating the matching of objects to range lines using a basic feasible solution (greedy) algorithm.

With reference being made to FIG. 7 and the flowchart of FIG. 9, the range line which corresponds to the object C is determined by calculating the perpendicular distances from the line-of-sight 20c to each of the range lines 24, 26 and 28 or extensions thereof as indicated in broken line. Lines drawn from the line-of-sight 20c perpendicularly intersect the range lines 24, 26 and 28 at points 34, 36 and 38 respectively. The lengths of these lines correspond to the variable d illustrated in FIG. 6, and are calculated using equation (15). The range line having the smallest perpendicular distance from the line-of-sight 20c is defined as being matched to the object C. In the example of FIG. 7, the range line 28 is matched to the object C since the distance from the line-of-sight 20c to the point 38 is smaller than the distances to the points 34 and 36.

It is theoretically possible using the greedy algorithm that some objects will be incorrectly matched to range lines since the solution is not globally optimized. However, this will not be a limitation in many practical scenarios depending on the geometry of the particular problem, and is offset by the speed at which the greedy algorithm can be performed for the objects simultaneously using parallel computer processing.

It will be noted that the range lines calculated using the above equations with the endpoints specified in an angular (spherical) coordinate system will not be exactly straight, but will have a slight curvature. The curvature is so slight that any resulting errors will be negligible in most practical applications. The curvature errors may be obviated by using an iterative algorithm for matching the az,el plots to the range lines in the field of view of the second sensor 16. Such an algorithm would function by incrementing the minimum range values and decrementing the maximum range values until one of the endpoints of the range line coincides with or over-runs the respective az,el plot point.

Figure 10:
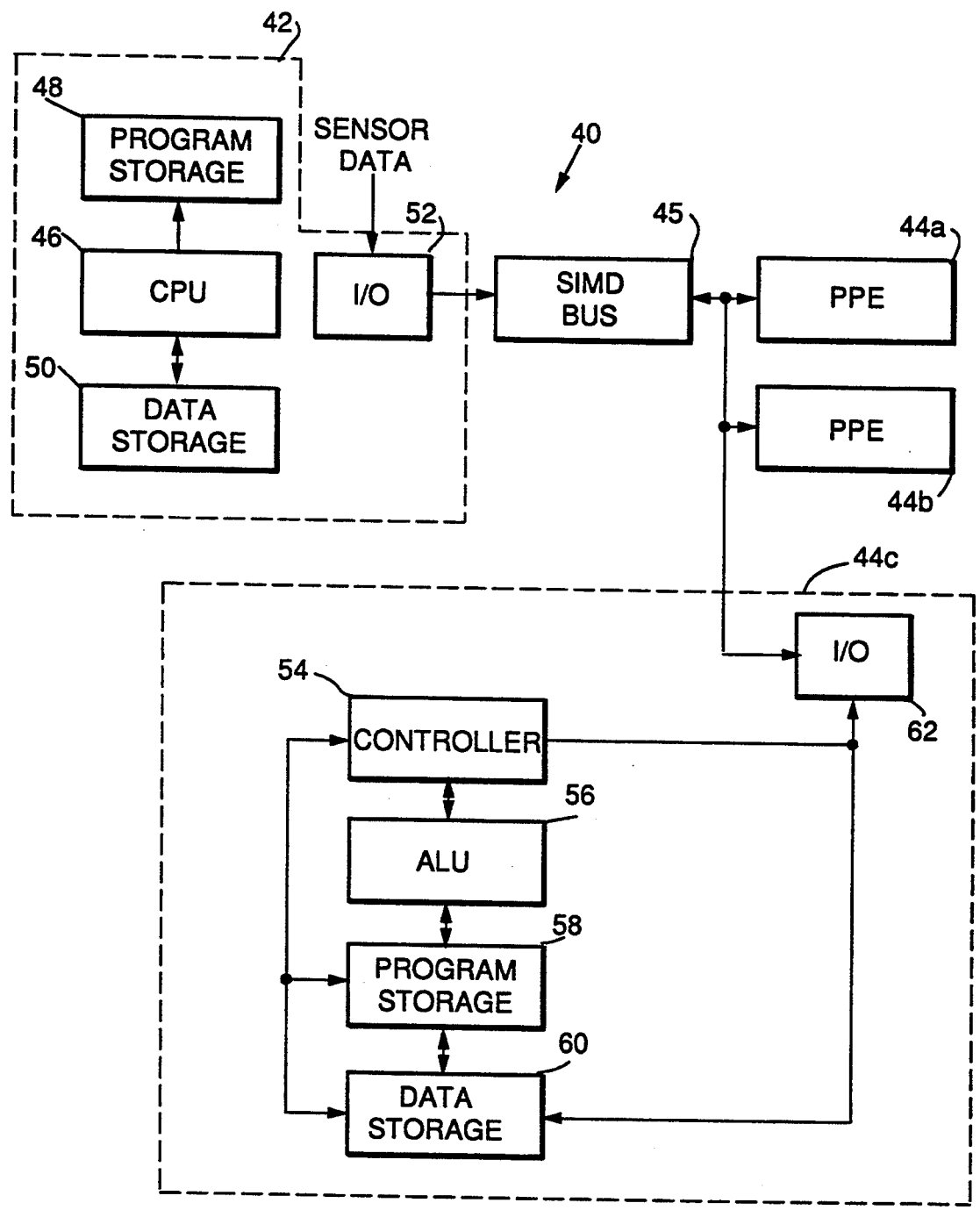
FIG. 10 is a schematic diagram illustrating a computing apparatus having a single instruction stream—multiple data stream (SIMD) configuration for performing the method of the invention using parallel processing.

Whereas the present method has been described above for calculating the positions of the objects sequentially (in series), it is within the scope of the present invention to perform the calculations simultaneously, thereby achieving a great increase in processing speed. A computer 40 for performing the present method using parallel processing is illustrated in FIG. 10, and includes a main processing element 42, a plurality of parallel processing elements 44a to 44c, and a bus 45 which interconnects the main element 42 with each of the parallel processing elements 44a to 44c. The preferred architecture for the computer 40 is single instruction stream—multiple data stream (SIMD), although the present invention is not so limited.

A parallel processing element is provided for each object whose position is to be determined. Although only three elements 44a to 44c are shown in FIG. 10 for determining the positions of the three objects A, B and C respectively, in a practical application, a number of parallel processing elements equal to the maximum anticipated number of objects will be provided. Hundreds or more parallel processing elements may be arranged in a suitable grid configuration (not shown).

The main processing element 42 includes a central processing and control unit (CPU) 46, a program storage memory 48 for storing program instruction code, a data storage memory 50 for storing data and intermediate results, and an input/output unit (I/O) 52 for connecting the main processing unit 42 to the bus 45. The I/O unit 52 is further connected to transmit data from the sensors 14 and 16 to the data memory 50.

The parallel processing elements 44a to 44c may be identical, with the individual components of only the element 44c shown in the drawing. The element 44c includes a controller 54, arithmetic logic unit (ALU) 56, program storage memory 58 and data storage memory 60. An I/O unit 62 transmits instructions in one direction from the main processing element 42 to the controller 54, and data in both directions between the main processing unit 42 and data storage 60.

The program memories 48 and 58 may be volatile, in which case the program code is provided on a suitable software media such as diskettes or magnetic tape and loaded into the memories 48 and 58. In such a configuration, the present method may be practiced using a commercially available computer having a parallel processing architecture, such as the "Connection Machine" manufactured by Thinking Machines, Corp. This computer has a SIMD architecture, and is described in an article entitled "ARCHITECTURE AND APPLICATIONS OF THE CONNECTION MACHINE", Computer magazine, vol. 21, no. 8, Aug. 1988, pp. 26–38.

Alternatively, the memories 48 and 58 may be non-volatile, with the program code being stored therein as firmware. In either case, the program memory 58 in each parallel processing element stores the program instructions necessary for performing the requisite computations for one object. The program memory 48 in the main processing unit 42 stores program instructions for overall control of the system, and instructions which are passed to the units 44 simultaneously causing the units 44a to 44c to perform computations in parallel. The data memory 50 initially stores the coordinates of the sensors 14 and 16, the minimum and maximum ranges $r_{min}$ and $r_{max}$ and the az,el coordinates of the objects which are subsequently transmitted to and stored in the individual memories 60 of the units 44a to 44c.

Figure 11:
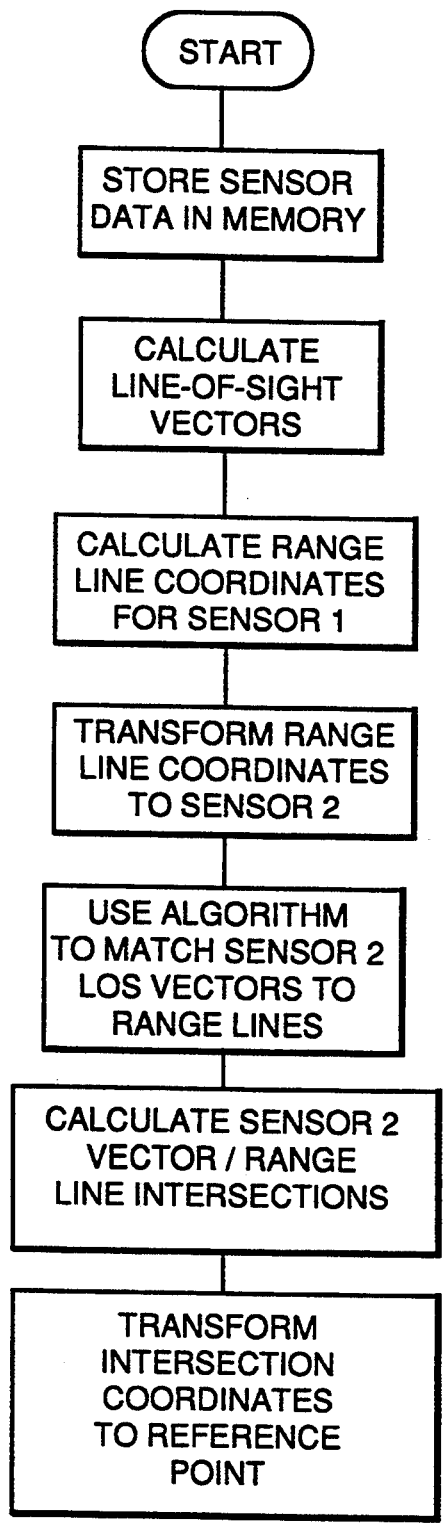
FIG. 11 is a flowchart illustrating the present method as performed using the parallel processing apparatus illustrated in FIG. 10.

A flowchart for performing the present method using the computer 40 is presented in FIG. 11. Steps 2 to 7 are performed in parallel by all of the parallel processing units 44a to 44c in response to single respective instructions fed thereto from the main processing unit 42. The process includes the following steps.

1. The coordinates of the sensors 14 and 16, the az,el coordinates or plots of the objects A, B and C relative to the sensors 14 and 16 and the predetermined minimum and maximum ranges are input to the main processing unit 42. The coordinates of the sensors 14 and 16 and minimum and maximum ranges are then transmitted to and stored in the data memories 60 of all of the parallel processing elements 44a, 44b and 44c. The plots for the objects A, B and C are fed to and stored in the memories 60 of the individual parallel processing units 44a to 44c respectively.

2. The line-of-sight vectors for the lines-of sight 18a to 18b and 20a to 20c for the objects A, B and C respectively are calculated.

3. The coordinates of the endpoints A' and A" defining the range lines 24, 26 and 28 relative to the first sensor 14 are calculated.

4. The range line coordinates are transformed into the field of view of the second sensor 16.

5. A selected algorithm (global optimization, greedy) is used to match the lines-of-sight 20a to 20c (sensor 2 plots) to the respective range lines 24 to 26.

6. The intersections (or approximate intersections) of the lines-of-sight 20a to 20c and the respective range lines 24, 26 and 28 are calculated.

7. The coordinates of the intersections are transformed into x,y,z coordinates relative to the origin 10.

EXAMPLE

A listing of a computer program DISPLAY written in the Pascal language for demonstrating the present method is presented below. The computer simulation indicates that the method works perfectly for the case of no registration error and no azimuth-elevation error. For cases in which registration errors and/or azimuth-elevation errors are present, the method works also, but these errors result in values of x, y, and z that are correct within a small range of tolerance.

Although included for completeness, a number of procedures in the program perform "housekeeping" functions such as defining variables and controlling the display of objects and lines on the computer screen. The following procedures perform calculations in accordance with the equations presented above which are especially relevant to the present method.

CRANK_LOS_VECTOR and PICK_VECTOR calculate line-of-sight vectors (los) relative to the sensors 14 and 16.

NEW_XYZ calculates x,y,z coordinates of the minimum and maximum range points.

TRANSFORM transforms the minimum and maximum range points into the field of view of the sensor 16.

FIND_CLOSEST uses the Greedy Algorithm to find the range line closest to a specified az,el plot.

COMPUTE_XYZ computes x,y,z coordinates of the closest az,el plot.

```
program DISPLAY;

uses dos,graph,crt;

{ This program displays detections from the detection files
generated by the program SENSORS. Track initiation is aided
by the procedure crank_los_vector. } const
   pathtodriver = 'c:\turbo';
   max_platform = 3;
   max_objects = 200;
   max_scans = 3;
   max_boosters = 20;
   pi = 3.1415926535898;
   rad_per_deg = 0.017453292519943;
   x_disp_range = 0.05;
   y_disp_range = 0.005;

type
   str10 = string[10];
   str15 = string[15];
   vector_3d_type = array[1..3] of real;
   object_types = (balloon,rv,booster);
   state_record_type = record
      x_coord    : real;
      y_coord    : real;
      z_coord    : real;
      x_vel      : real;
      y_vel      : real;
      z_vel      : real;
   end;
   lat_long_record_type = record
      latitude : real;
```

```
     longitude : real;
     height : real;
   end;
   detection_record_type = record
     azimuth    : real;
     elevation : real;
   end;
   detection2_record_type = record
     dr : detection_record_type;
     state : vector_3d_type;
     object_type : object_types;
     clump_num : integer;
   end;
   booster_launch_record_type = record
     longitude : real;
     latitude : real;
     height : real;
     vel_horizontal : real;
     vel_vertical : real;
     vx_add : real;
     vy_add : real;
     vz_add : real;
     launch_time : integer;
   end;
   booster_record_type = record
     state              : state_record_type;
     empty              : boolean;
     rv_count           : integer;
     cannister_count    : integer;
     last_deployment    : integer;
     deploy_direction   : vector_3d_type;
     impact             : boolean;
     launch_time        : integer;
   end;
   object_record_type = record
     state         : state_record_type;
     object_type   : object_types;
     clump_num     : integer;
     impact        : boolean;
   end;
   impact_record_type = record
     latitude : real;
     longitude : real;
     object_type : integer;
   end;
   spit_rec_type = record
     x_coord : real;
     y_coord : real;
     z_coord : real;
     clump : integer;
     c : char;
   end;
   object_node_type = ^object_array_type;
     object_array_type =
   array[1..max_platform,1..max_scans,1..max_objects]of
                 detection2_record_type;
```

```
  booster_launch_node_type = ^booster_launch_array_type;
  booster_launch_array_type = array[1..max_boosters]of
                              booster_launch_record_type;
  file_name_type = String[80];
  platform_lat_long_array_type = array[1..max_platform]of
lat_long_record_type;
  platform_states_type   =   array[1..max_platform]of
state_record_type;
  detect_node_type = ^detect_array_type;
  detect_array_type   =   array[1..max_objects]   of
detection2_record_type;
  plot_count_type = array[1..max_platform,1..max_scans] of
integer;
  object_nums_node_type = ^object_nums_type;
  object_nums_type =
array[1..max_platform,1..max_scans,1..max_objects]   of
integer;
  platform_reals_array = array[1..max_platform]of real;
  vector_3d_array_type =
array[1..max_platform,1..max_scans]of vector_3d_type;

var
  infilename : file_name_type;
  object_node : object_node_type;
  object_nums : object_nums_node_type;
  booster_launch_node : booster_launch_node_type;
  rvs_per_booster : integer;
  balloons_per_cannister : integer;
  cannisters_per_rv : integer;
  booster_count : integer;
  booster_eject_speed : real;
  balloon_eject_speed : real;
  azimuth_range : real;
  elevation_range : real;
  rv_eject_speed : real;
  booster_eject_rate : integer;
  atmosphere_thickness : real;
  post_eject_burn_speed : real;
  starting_time : integer;
  ending_time : integer;
  scan_rate : integer;
  time_step : integer;
  object_count : integer;
  eject_start_time : integer;
  done : boolean;
  c : char;
  current_time : integer;
  counter : integer;
  graphdriver : integer;
  graphmode : integer;
  in_file_name : file_name_type;
  out_file_name : file_name_type;
  impact_file_name : file_name_type;
  file_var : file;
  file_var2 : text;
  file_var3 : text;
  file_var4 : file;
```

```
   junk : string[80];
   time_string : str15;
   object_impact_count : integer;
   booster_impact_count : integer;
   txt : str15;
   platform_lat_long : platform_lat_long_array_type;
   platform_count : integer;
   detect_array : detect_node_type;
   detects : integer;
   pat_az : real;
   pat_el : real;
   real_az : real;
   real_el : real;
   plot_count : plot_count_type;
   min_azimuth : real;
   max_azimuth : real;
   min_elevation : real;
   max_elevation : real;
   num_clusters : integer;
   xmin : platform_reals_array;
   xmax : platform_reals_array;
   ymin : platform_reals_array;
   ymax : platform_reals_array;
   start_time : integer;
   temp : str15;
   xrange : platform_reals_array;
   yrange : platform_reals_array;
   pos : vector_3d_array_type;
   vel : vector_3d_array_type;
   vel_x_pos : vector_3d_array_type;
   guess_range_min : real;
   guess_range_max : real;

procedure init_video;
   begin
      graphdriver := 9;
      graphmode := 2;
      initgraph(graphdriver,graphmode,pathtodriver);
   end;

procedure make_header;
   begin
      writeln('                                             HUGHES AIRCRAFT
COMPANY');
      writeln('                                           NEURAL NETWORK TRACK
INITIATION SIMULATION');
      writeln;
      writeln;
   end;

procedure get_start_info(var infilename : file_name_type;
                            var start_time : integer);

begin
{     write('Enter Detection File Name : ');
      readln(infilename);
      write('Enter Starting Detection Time : ');
```

```pascal
      readln(start_time);
      write('Enter Minimum Correlation Range : ');
      readln(guess_range_min);
      write('Enter Maximum Correlation Range : ');
      readln(guess_range_max); }
      infilename := 'la_small.det';
      start_time := 1000;
      guess_range_min :=  5000000.0;
{     guess_range_min := 5436774.50; }
      guess_range_max :=  6000000.0;
   end;

procedure makelogo(x : integer;
                   y : integer);

begin
   setfillstyle(solidfill,lightblue);
   setcolor(lightblue);
   circle(x + 5,y + 5,3);
   circle(x + 5,y + 12,3);
   circle(x + 55,y + 5,3);
   circle(x + 55,y + 12,3);
   floodfill(x + 5,y + 5,lightblue);
   floodfill(x + 5,y + 12,lightblue);
   floodfill(x + 55,y + 5,lightblue);
   floodfill(x + 55,y + 12,lightblue);
   line(x + 5,y + 2,x + 55,y + 2);
   line(x + 58,y + 5,x + 58,y + 11);
   line(x + 55,y + 15,x + 5,y + 15);
   line(x + 2,y + 11,x + 2,y + 5);
   floodfill(x + 15,y + 5,lightblue);
   floodfill(x + 3,y + 9,lightblue);
   floodfill(x + 57,y + 9,lightblue);
   setcolor(white);
   outtextxy(x + 8,y + 6,'HUGHES');
end;

function get_date : str10;

var
   year,month,day,dayofweek : word;
   temp : str10;
   total : str10;

begin
   getdate(year,month,day,dayofweek);
   str(month,temp);
   total := '';
   if month < 10 then
      total := total + '0';
   total := total + temp + '-';
   str(day,temp);
   if day < 10 then
      total := total + '0';
   total := total + temp + '-';
   str(year,temp);
   total := total + temp;
```

```
    get_date := total;
end;

function get_time : str10;
  var
    hour,minute,second,hundredths : word;
    temp : str10;
    total : str10;

begin
    gettime(hour,minute,second,hundredths);
    str(hour,temp);
    total := '';
    if hour < 10 then
       total := '0';
    total := total + temp + ':';
    str(minute,temp);
    if minute < 10 then
       total := total + '0';
    total := total + temp + ':';
    str(second,temp);
    if second < 10 then
       total := total + '0';
    total := total + temp;
    get_time := total;
  end;

procedure init_screen;

var
    txt : string[40];

begin
    setcolor(lightblue);
    rectangle(0,20,639,479);
    rectangle(1,21,638,478);
    setcolor(yellow);
    rectangle(7,27,468,246);
    rectangle(8,28,467,245);
    setcolor(yellow);
    rectangle(7,254,468,470);
    rectangle(8,255,467,469);
    setcolor(yellow);
    rectangle(474,27,632,246);
    rectangle(475,28,631,245);
    txt := 'SENSOR 1';
    outtextxy(554 - textwidth(txt) div 2,40,txt);
    setcolor(yellow);
    rectangle(474,254,632,470);
    rectangle(475,255,631,469);
    txt := 'SENSOR 2';
    outtextxy(554 - textwidth(txt) div 2,267,txt);
    makelogo(140,-1);
    setcolor(white);
    outtextxy(210,5,'NEURAL     NETWORK     DATA     FUSION
SIMULATION');
  end;
```

```
procedure init_vars;

begin
   min_azimuth := (-azimuth_range / 2);
   max_azimuth := (azimuth_range / 2);
   min_elevation := 0;
   max_elevation := elevation_range;
   num_clusters := cannisters_per_rv * rvs_per_booster *
booster_count;
end;

procedure read_params(var file_var4 : file);

var
   counter : integer;
   txt : string[24];
   ver : real;
   rr : integer;

begin
   ver := 1.00;
   blockread(file_var4,ver,sizeof(ver),rr);
   txt := 'ATMOSPHERE THICKNESS    ';
   blockread(file_var4,txt,sizeof(txt),rr);

blockread(file_var4,atmosphere_thickness,sizeof(atmospher
e_thickness),rr);
   txt := 'RVS PER BOOSTER         ';
   blockread(file_var4,txt,sizeof(txt),rr);

blockread(file_var4,rvs_per_booster,sizeof(rvs_per_booste
r),rr);
   txt := 'BALLOONS PER CANNISTER  ';
   blockread(file_var4,txt,sizeof(txt),rr);

blockread(file_var4,balloons_per_cannister,sizeof(balloon
s_per_cannister),rr);
   txt := 'CANNISTERS PER RV       ';
   blockread(file_var4,txt,sizeof(txt),rr);

blockread(file_var4,cannisters_per_rv,sizeof(cannisters_p
er_rv),rr);
   txt := 'BOOSTER COUNT           ';
   blockread(file_var4,txt,sizeof(txt),rr);

blockread(file_var4,booster_count,sizeof(booster_count),r
r);
   txt := 'MAX BOOSTER EJECT SPEED ';
   blockread(file_var4,txt,sizeof(txt),rr);

blockread(file_var4,booster_eject_speed,sizeof(booster_ej
ect_speed),rr);
   txt := 'MAX BALLOON EJECT SPEED ';
   blockread(file_var4,txt,sizeof(txt),rr);

blockread(file_var4,balloon_eject_speed,sizeof(balloon_ej
ect_speed),rr);
```

```
    txt := 'MAX RV EJECT SPEED        ';
    blockread(file_var4,txt,sizeof(txt),rr);

blockread(file_var4,rv_eject_speed,sizeof(rv_eject_speed)
,rr);
    txt := 'BOOSTER EJECT RATE        ';
    blockread(file_var4,txt,sizeof(txt),rr);

blockread(file_var4,booster_eject_rate,sizeof(booster_eje
ct_rate),rr);
    txt := 'POST EJECT BURN SPEED     ';
    blockread(file_var4,txt,sizeof(txt),rr);

blockread(file_var4,post_eject_burn_speed,sizeof(post_eje
ct_burn_speed),rr);
    txt := 'STARTING TIME             ';
    blockread(file_var4,txt,sizeof(txt),rr);

blockread(file_var4,starting_time,sizeof(starting_time),r
r);
    txt := 'ENDING TIME               ';
    blockread(file_var4,txt,sizeof(txt),rr);

blockread(file_var4,ending_time,sizeof(ending_time),rr);
    txt := 'SCAN RATE                 ';
    blockread(file_var4,txt,sizeof(txt),rr);
    blockread(file_var4,scan_rate,sizeof(scan_rate),rr);
    txt := 'INTEGRATION TIME STEP     ';
    blockread(file_var4,txt,sizeof(txt),rr);
    blockread(file_var4,time_step,sizeof(time_step),rr);
    txt := 'EJECT START TIME          ';
    blockread(file_var4,txt,sizeof(txt),rr);

blockread(file_var4,eject_start_time,sizeof(eject_start_t
ime),rr);
    txt := 'BOOSTER INITIAL STATES    ';
    blockread(file_var4,txt,sizeof(txt),rr);
    for counter := 1 to booster_count do
      begin blockread(file_var4,booster_launch_node^[counter].longitu
de, sizeof(booster_launch_node^[counter].longitude),rr);

blockread(file_var4,booster_launch_node^[counter].latitude, sizeof(booster_launch_node^[counter].latitude),rr);

blockread(file_var4,booster_launch_node^[counter].height, sizeof(booster_launch_node^[counter].height),rr);

blockread(file_var4,booster_launch_node^[counter].vel_hor
izontal, sizeof(booster_launch_node^[counter].vel_horizontal),rr);
```

```
blockread(file_var4,booster_launch_node^[counter].vel_ver
tical, sizeof(booster_launch_node^[counter].vel_vertical),rr);

blockread(file_var4,booster_launch_node^[counter].vx_add, sizeof(booster_launch_node^[counter].vx_add),rr);

blockread(file_var4,booster_launch_node^[counter].vy_add, sizeof(booster_launch_node^[counter].vy_add),rr);

blockread(file_var4,booster_launch_node^[counter].vz_add, sizeof(booster_launch_node^[counter].vz_add),rr);

blockread(file_var4,booster_launch_node^[counter].launch_
time, sizeof(booster_launch_node^[counter].launch_time),rr);
    end;
  txt := 'PLATFORM COUNT          ';
  blockread(file_var4,txt,sizeof(txt),rr);

blockread(file_var4,platform_count,sizeof(platform_count)
,rr);
  txt := 'AZIMUTH RANGE          ';
  blockread(file_var4,txt,sizeof(txt),rr);

blockread(file_var4,azimuth_range,sizeof(azimuth_range),r
r);
  txt := 'ELEVATION RANGE        ';
  blockread(file_var4,txt,sizeof(txt),rr);

blockread(file_var4,elevation_range,sizeof(elevation_rang
e),rr);
  txt := 'PLATFORM INITIAL STATES ';
  blockread(file_var4,txt,sizeof(txt),rr);
  for counter := 1 to platform_count do
    begin blockread(file_var4,platform_lat_long[counter].longitude, sizeof(platform_lat_long[counter].longitude),rr);

blockread(file_var4,platform_lat_long[counter].latitude, sizeof(platform_lat_long[counter].latitude),rr);

blockread(file_var4,platform_lat_long[counter].height, sizeof(platform_lat_long[counter].height),rr);
    end;
  end;
```

```
procedure read_detects(var file_var4 : file;
                      var txt : str15;
                      var plt : integer;
                      scan_num : integer);

var
  count : integer;
  temp : real;
  c : char;
  rr : integer;
  platform_number : integer;
  detects : integer;
  temp2 : integer;
  count2 : integer;
  az : real;
  el : real;

begin
  for count2 := 1 to platform_count do
    begin
      blockread(file_var4,txt,sizeof(txt),rr);
      if (txt = 'PLATFORM NUMBER') then
        begin blockread(file_var4,platform_number,sizeof(platform_number),rr);
          blockread(file_var4,txt,sizeof(txt),rr);

blockread(file_var4,detects,sizeof(detects),rr);

blockread(file_var4,pos[platform_number,scan_num],sizeof(pos[1,1]),rr);

blockread(file_var4,vel[platform_number,scan_num],sizeof(vel[1,1]),rr);

blockread(file_var4,vel_x_pos[platform_number,scan_num],sizeof(vel_x_pos[1,1]),rr);
          plot_count[platform_number,scan_num]     :=
detects;
          plt := 0;
          for count := 1 to detects do
            begin
              plt := plt + 1;

blockread(file_var4,temp2,sizeof(temp2),rr);
              blockread(file_var4,az,sizeof(az),rr);
              blockread(file_var4,el,sizeof(el),rr);

blockread(file_var4,pat_az,sizeof(pat_az),rr);

blockread(file_var4,pat_el,sizeof(pat_el),rr);

blockread(file_var4,object_node^[platform_number,scan_num,plt].state,
```

```
sizeof(object_node^[platform_number,scan_num,plt].state),
rr);
                blockread(file_var4,c,sizeof(c),rr);

blockread(file_var4,detect_array^[count].clump_num, sizeof(detect_array^[count].clump_num),rr);
                az := az * rad_per_deg;
                el := el * rad_per_deg;
{               az := trunc(10000 * (az * rad_per_deg)) /
10000;
                el := trunc(10000 * (el * rad_per_deg)) /
10000;
                az := az + (random(4) - 2) * 0.0001;
                el := el + (random(4) - 2) * 0.0001;   }
                if (az > pi) then
                   az := az - 2 * pi;
                if (el > pi) then
                   el := el - 2 * pi;

object_node^[platform_number,scan_num,plt].dr.azimuth   :=
az;

object_node^[platform_number,scan_num,plt].dr.elevation :=
el;
                object_nums^[platform_number,scan_num,plt]
:= temp2;
                                                         if
(object_node^[platform_number,scan_num,plt].dr.azimuth   <
xmin[platform_number]) then
                        xmin[platform_number]   :=
object_node^[platform_number,scan_num,plt].dr.azimuth;
                                                         if
(object_node^[platform_number,scan_num,plt].dr.azimuth   >
xmax[platform_number]) then
                        xmax[platform_number]   :=
object_node^[platform_number,scan_num,plt].dr.azimuth;
                                                         if
(object_node^[platform_number,scan_num,plt].dr.elevation <
ymin[platform_number]) then
                        ymin[platform_number]   :=
object_node^[platform_number,scan_num,plt].dr.elevation;
                                                         if
(object_node^[platform_number,scan_num,plt].dr.elevation >
ymax[platform_number]) then
                        ymax[platform_number]   :=
object_node^[platform_number,scan_num,plt].dr.elevation;
                    end;
                end
        else if (txt <> 'END SCENARIO    ') then
            writeln('ERROR !!! TXT(PLATFORM NUMBER) = ',txt)
    end;
end;

procedure spit_detects;
```

```
var
  count : integer;
  count2 : integer;
  file_var : text;
  scan_num : integer;

begin
  assign(file_var,'spit2.out');
  rewrite(file_var);
  for scan_num := 1 to 3 do
    begin
      for count2 := 1 to platform_count do
        begin
          writeln(file_var,'PLATFORM NUMBER');
          writeln(file_var,count2:1);
          writeln(file_var,'DETECTIONS');
          detects := plot_count[count2,scan_num];
          writeln(file_var,detects:1);
          for count := 1 to detects do
            begin
              write(count:5,'  ');

write(file_var,object_node^[count2,scan_num,count].dr.azi
muth:10:5,'  ');

writeln(file_var,object_node^[count2,scan_num,count].dr.e
levation:10:5);
          end;
        end
    end;
  writeln(file_var,xmax[1],'   ',xmin[1]);
  writeln(file_var,ymax[1],'   ',ymin[1]);
  writeln(file_var,xmax[2],'   ',xmin[2]);
  writeln(file_var,ymax[2],'   ',ymin[2]);
  close(file_var);
end;

procedure read_detects2(var file_var4 : file;
                       var txt : str15);
var
  count : integer;
  temp : real;
  c : char;
  rr : integer;
  platform_number : integer;
  detects : integer;
  temp2 : integer;
  count2 : integer;

begin
  for count2 := 1 to platform_count do
    begin
      blockread(file_var4,txt,sizeof(txt),rr);
      if (txt = 'PLATFORM NUMBER') then
        begin
```

```
blockread(file_var4,platform_number,sizeof(platform_numbe
r),rr);
            blockread(file_var4,txt,sizeof(txt),rr);

blockread(file_var4,detects,sizeof(detects),rr);

blockread(file_var4,pos[platform_number,1],sizeof(pos[1,1
]),rr);

blockread(file_var4,vel[platform_number,1],sizeof(vel[1,1
]),rr);

blockread(file_var4,vel_x_pos[platform_number,1],sizeof(v
el_x_pos[1,1]),rr);
            for count := 1 to detects do
              begin blockread(file_var4,temp2,sizeof(temp2),rr);
            blockread(file_var4,temp,sizeof(temp),rr);
            blockread(file_var4,temp,sizeof(temp),rr);

blockread(file_var4,pat_az,sizeof(pat_az),rr);

blockread(file_var4,pat_el,sizeof(pat_el),rr);

blockread(file_var4,object_node^[platform_number,1,1].sta
te, sizeof(object_node^[platform_number,1,1].state),rr);
            blockread(file_var4,c,sizeof(c),rr);
blockread(file_var4,detect_array^[count].clump_num, sizeof(detect_array^[count].clump_num),rr);
              end;
          end
        else if (txt <> 'END SCENARIO   ') then
          writeln('ERROR !!! TXT(PLATFORM NUMBER) = ',txt)
      end;
  end;

procedure get_plots(var file_var : file);

var
    flag : boolean;
    count : integer;
    current_time : integer;
    done : boolean;
    az : real;
    el : real;
    xpos : real;
    ypos : real;
    category : integer;
    plots : integer;
    scans : integer;
    dummy : integer;
    plt : integer;
    txt : str15;
```

```
      count2 : integer;
      found : boolean;
      num_tot_temp : integer;
      scan_num : integer;

begin
      flag := false;
      scan_num := 0;
      done := false;
      for plt := 1 to platform_count do
         begin
            xmin[plt] := 1e7;
            xmax[plt] := -1e7;
            ymin[plt] := 1e7;
            ymax[plt] := -1e7;
         end;
      while (not eof(file_var)) and (not done) do
         begin blockread(file_var,time_string,sizeof(time_string),counter);
            if (txt = 'END SCENARIO    ') then
               done := true
            else if (time_string = 'CURRENT TIME    ') then
               begin blockread(file_var,current_time,sizeof(current_time),counter);
                  if (current_time >= start_time) then
                     begin
                        if current_time = start_time then
                           begin
                              scan_num := 1;
                              flag := true;
                              plt := 0;
                           end
                        else
                           begin
                              scan_num := scan_num + 1;
                              if scan_num > 3 then
                                 done := true;
                              plt := 0;
                           end;
                        if (not done) then
                           read_detects(file_var,txt,plt,scan_num);
                     end
                  else
                     read_detects2(file_var,txt);
               end
            else
               writeln('ERROR !!! TXT(CURRENT_TIME) = ',txt);
         end;
      close(file_var);
   end;

procedure draw_plots;
```

```
var
  count : integer;
  plotx : real;
  ploty : real;
  xpix : longint;
  ypix : longint;
  scan : integer;
  platform : integer;
  rad : integer;
  xoff : integer;
  yoff : integer;

begin
  rad := 4;
  for platform := 1 to 2 do
    begin
        xrange[platform]    :=    xmax[platform]    -
xmin[platform];
        yrange[platform]    :=    ymax[platform]    -
ymin[platform];
      xrange[platform] := 2 * xrange[platform];
      yrange[platform] := 2 * yrange[platform];
      for scan := 1 to 3 do
        for count := 1 to plot_count[platform,scan] do
          begin
                                             p l o t x    : =
object_node^[platform,scan,count].dr.azimuth;
                                             p l o t y    : =
object_node^[platform,scan,count].dr.elevation;
            xpix := trunc(((plotx - xmin[platform]) /
xrange[platform]) * 430) + 100;
            case platform of
{                1 : ypix := 230 - trunc(((ploty -
ymin[platform]) / yrange[platform]) * 190);
                 2 : ypix := 460 - trunc(((ploty -
ymin[platform]) / yrange[platform]) * 190);  }
                 1 : ypix := 200 - trunc(((ploty -
ymin[platform]) / yrange[platform]) * 190);
                 2 : ypix := 420 - trunc(((ploty -
ymin[platform]) / yrange[platform]) * 190);
            end;
            setcolor(lightmagenta);
            circle(xpix,ypix,rad);
            case scan of
              1 : setfillstyle(1,green);
              2 : setfillstyle(1,cyan);
              3 : setfillstyle(1,lightred);
            end;
            floodfill(xpix,ypix,lightmagenta);
            setcolor(red);
            circle(xpix,ypix,rad);
          end;
    end;
end;

procedure cross_3d(vector1 : vector_3d_type;
                   vector2 : vector_3d_type;
                   var result_vector : vector_3d_type);
```

```
  begin
    result_vector[1]  :=  vector1[2] * vector2[3] -
vector1[3] * vector2[2];
    result_vector[2]  :=  vector1[3] * vector2[1] -
vector1[1] * vector2[3];
    result_vector[3]  :=  vector1[1] * vector2[2] -
vector1[2] * vector2[1];
  end;

function dot_3d(vector1 : vector_3d_type;
                  vector2 : vector_3d_type) : real;

var
    temp : real;
    count : integer;
  begin
    temp := 0;
    for count := 1 to 3 do
      temp := temp + vector1[count] * vector2[count];
    dot_3d := temp;
  end;

procedure normalize_3d(var vector : vector_3d_type);

var
    mag : real;
    count : integer;

begin
    mag := 0;
    for count := 1 to 3 do
      mag := mag + sqr(vector[count]);
    mag := sqrt(mag);
    for count := 1 to 3 do
      vector[count] := vector[count]/mag;
  end;

procedure crank_los_vector(azimuth : real;
                             elevation : real;
                             pos : vector_3d_type;
                             vel : vector_3d_type;
                             vel_x_pos : vector_3d_type;
                             range : real;
                             var vec1 : vector_3d_type;
                             var vec2 : vector_3d_type);

var
    d : real;
    e : real;
    f : real;
    g : real;
    h : real;
    j : real;
    k : real;
    l : real;
    m : real;
    n : real;
```

```
      a : real;
      b : real;
      c : real;
      temp2 : real;
      txt : str15;

begin
      normalize_3d(pos);
      temp2 := cos(azimuth);
      if (abs(temp2) < 0.0000000001) then
         temp2 := 0.0000000001;
      d := sin(azimuth) / temp2;
      temp2 := cos(elevation);
      if (abs(temp2) < 0.0000000001) then
         temp2 := 0.0000000001;
      e := sin(elevation) / temp2;
      f := (vel_x_pos[2] - vel[2] * d) / (vel[1] * d - vel_x_pos[1]);
      g := (vel_x_pos[3] - vel[3] * d) / (vel[1] * d - vel_x_pos[1]);
      h := sqrt(sqr(range) / (sqr(e) + 1));
      j := h / (pos[1] * f + pos[2]);
      k := (pos[1] * g + pos[3]) / (pos[1] * f + pos[2]);
      l := sqr(g - f * k) + sqr(k) + 1;
      m := 2 * f * j * (g - f * k) - 2 * j * k;
      n := sqr(f * j) + sqr(j) - sqr(range);
      c := (-m + sqrt(sqr(m) - 4 * l * n)) / (2 * l);
      b := j - c * k;
      a := f * j + c * (g - f * k);
      vec1[1] := a;
      vec1[2] := b;
      vec1[3] := c;
      c := (-m - sqrt(sqr(m) - 4 * l * n)) / (2 * l);
      b := j - c * k;
      a := f * j + c * (g - f * k);
      vec2[1] := a;
      vec2[2] := b;
      vec2[3] := c;
      if (vel[2] < 0) then
         begin
            vec1[1] := -vec1[1];
            vec1[2] := -vec1[2];
            vec1[3] := -vec1[3];
            vec2[1] := -vec2[1];
            vec2[2] := -vec2[2];
            vec2[3] := -vec2[3];
         end;
   end;

procedure pick_vector(vec1 : vector_3d_type;
                      vec2 : vector_3d_type;
                      base : vector_3d_type;
                      var ans : vector_3d_type);

var
      temp : vector_3d_type;
      a : real;
      b : real;
```

```
begin
  a := dot_3d(vec1,base);
  b := dot_3d(vec2,base);
  if (a > 0) and (b > 0) then
    begin
        setcolor(white);
        outtextxy(10,10,'<VEC1,BASE> > 0 and <VEC2,BASE> >
0');
     end;
   if (a < b) then
     temp := vec2
   else
     temp := vec1;
   ans := temp;
end;

function arctan2(x : real;
                 y : real) : real;

var
  temp : real;

begin
  temp := arctan(y/x);
  if (x < 0) and (y > 0) then
    temp := pi + temp
  else if (x < 0) and (y < 0) then
    temp := pi + temp;
  if temp < 0 then
    temp := temp + 2 * pi;
  arctan2 := temp;
end;

procedure transform(object_state : vector_3d_type;
                    pos : vector_3d_type;
                    vel : vector_3d_type;
                    vel_x_pos : vector_3d_type;
                    var new_az : real;
                    var new_el : real);

var
  line_of_sight : vector_3d_type;
  elevation_cos : real;
  elevation_sin : real;
  temp : detection_record_type;
  ans : boolean;
  temp2 : real;
  norm_pos : vector_3d_type;
  range : real;
  txt1,txt2,txt3 : str15;

begin
  line_of_sight[1] := object_state[1] - pos[1];
  line_of_sight[2] := object_state[2] - pos[2];
  line_of_sight[3] := object_state[3] - pos[3];
  norm_pos := pos;
  normalize_3d(norm_pos);
  range := sqrt(dot_3d(line_of_sight,line_of_sight));
```

```
    temp.azimuth := arctan2(dot_3d(vel,line_of_sight),
dot_3d(vel_x_pos,line_of_sight));
    elevation_cos := -dot_3d(norm_pos,line_of_sight)/range;
    elevation_sin := sqrt(1-sqr(elevation_cos));
    temp.elevation := arctan2(elevation_cos,elevation_sin);
    new_az := temp.azimuth;
    new_el := temp.elevation;
  end;

procedure new_xyz(platform_state : vector_3d_type;
                    los_vector : vector_3d_type;
                    var new_object_state : vector_3d_type);
  begin
    new_object_state[1]    :=    platform_state[1]    +
los_vector[1];
    new_object_state[2]    :=    platform_state[2]    +
los_vector[2];
    new_object_state[3]    :=    platform_state[3]    +
los_vector[3];
  end;

procedure draw_new_points(new_az : real;
                            new_el : real;
                            platform : integer;
                            var x : integer;
                            var y : integer);
  var
    count : integer;
    plotx : real;
    ploty : real;
    xpix : longint;
    ypix : longint;
    scan : integer;
    rad : integer;
    txt : str15;
  begin
    rad := 4;
    xrange[platform] := xmax[platform] - xmin[platform];
    yrange[platform] := ymax[platform] - ymin[platform];
    xrange[platform] := 2 * xrange[platform];
    yrange[platform] := 2 * yrange[platform];
    plotx := new_az;
    ploty := new_el;
{       xpix  :=   trunc(((plotx  -  xmin[platform])  /
xrange[platform]) * 430) + 20;  }
    xpix    :=    trunc(((plotx  -   xmin[platform])   /
xrange[platform]) * 430) + 100;
    case platform of
{      1 : ypix := 230 - trunc(((ploty - ymin[platform]) /
yrange[platform]) * 190);
       2 : ypix := 460 - trunc(((ploty - ymin[platform]) /
yrange[platform]) * 190);  }
       1 : ypix := 200 - trunc(((ploty - ymin[platform]) /
yrange[platform]) * 190);
```

```
  2 : ypix := 420 - trunc(((ploty - ymin[platform]) /
yrange[platform]) * 190);
  end;
  setcolor(lightmagenta);
  circle(xpix,ypix,rad);
  setfillstyle(solidfill,white);
  floodfill(xpix,ypix,lightmagenta);
  setcolor(red);
  circle(xpix,ypix,rad);
  x := xpix;
  y := ypix;
end;

procedure find_closest(az1 : real;
                       el1 : real;
                       az2 : real;
                       el2 : real;
                       platform : integer;
                       scan : integer;
                       var best : integer;
                       var factor : real;
                       var shortest : real;
                       var top_dp : real);

var
  plot : integer;
  dp : real;
  dist : real;
  vec1 : vector_3d_type;
  vec2 : vector_3d_type;
  len1 : real;
  len2 : real;
  len : real;
  best_dp : real;
  cos_term : real;

begin
  vec1[1] := az1 - az2;
  vec1[2] := el1 - el2;
  vec1[3] := 0;
  shortest := 1e20;
  best := 0;
  best_dp := 0;
  len1 := sqrt(sqr(vec1[1]) + sqr(vec1[2]) + sqr(vec1[3]));
  for plot := 1 to plot_count[platform,scan] do
    begin
      vec2[1] := object_node^[platform,scan,plot].dr.azimuth - az2;
      vec2[2] := object_node^[platform,scan,plot].dr.elevation - el2;
      vec2[3] := 0;
      len2 := sqrt(sqr(vec2[1]) + sqr(vec2[2]) + sqr(vec2[3]));
      cos_term := dot_3d(vec1,vec2) / (len1 * len2);
      dp := len2 * cos_term;
      if (dp >= 0) and (dp <= len1) then
```

```
            begin
              dist := sqrt(sqr(len2) - sqr(dp));
              if (dist < shortest) then
                begin
                  best := plot;
                  shortest := dist;
                  best_dp := dp;
                end;
            end;
        end;
    end;
  if (best <> 0) then
    factor := best_dp / len1
  else
    factor := 0;
  top_dp := best_dp;
end;

procedure compute_xyz(platform : integer;
                      scan : integer;
                      guess_range_min : real;
                      guess_range_max : real;
                      factor : real;
                      new_posa : vector_3d_type;
                      new_posb : vector_3d_type;
                      plot : integer;
                      var est_xyz : vector_3d_type);

var
  r1 : real;
  r2 : real;
  r2_vector : vector_3d_type;
  r_object : real;
  b_vector : vector_3d_type;
  alpha_vector : vector_3d_type;
  alpha : real;
  b : real;
  a : real;
  c : real;
  cos_2 : real;
  cos_alpha : real;
  sin_alpha : real;
  vec1 : vector_3d_type;
  vec2 : vector_3d_type;
  begin
    r2_vector[1] := pos[platform,scan][1] - new_posb[1];
    r2_vector[2] := pos[platform,scan][2] - new_posb[2];
    r2_vector[3] := pos[platform,scan][3] - new_posb[3];
    r2 := sqrt(sqr(r2_vector[1]) + sqr(r2_vector[2]) +
sqr(r2_vector[3]));
    b_vector[1] := new_posa[1] - new_posb[1];
    b_vector[2] := new_posa[2] - new_posb[2];
    b_vector[3] := new_posa[3] - new_posb[3];
    b := sqrt(sqr(b_vector[1]) + sqr(b_vector[2]) +
sqr(b_vector[3]));
    cos_2 := dot_3d(r2_vector,b_vector) / (r2 * b);
    c := r2 * cos_2;
    a := sqrt(sqr(r2) - sqr(c));
```

```
crank_los_vector(object_node^[platform,scan,plot].dr.azim
uth, object_node^[platform,scan,plot].dr.elevation,
                    pos[platform,scan],vel[platform,scan], vel_x_pos[platform,scan],guess_range_min,
                    vec1,vec2);
    pick_vector(vec1,vec2,vel[platform,scan],alpha_vector);
    alpha_vector[1] := -alpha_vector[1];
    alpha_vector[2] := -alpha_vector[2];
    alpha_vector[3] := -alpha_vector[3];
     alpha       :=   sqrt(sqr(alpha_vector[1])    +
sqr(alpha_vector[2]) + sqr(alpha_vector[3]));
    cos_alpha := dot_3d(alpha_vector,b_vector) / (alpha *
b);
    sin_alpha := sqrt(1 - sqr(cos_alpha));
    r_object := a / sin_alpha;
    alpha_vector[1] := -alpha_vector[1];
    alpha_vector[2] := -alpha_vector[2];
    alpha_vector[3] := -alpha_vector[3];
    normalize_3d(alpha_vector);
    est_xyz[1] := pos[platform,scan][1] + alpha_vector[1]
* r_object;
    est_xyz[2] := pos[platform,scan][2] + alpha_vector[2]
* r_object;
    est_xyz[3] := pos[platform,scan][3] + alpha_vector[3]
* r_object;
  end;

procedure estimate_xyz(platform1 : integer;
                         platform2 : integer;
                         scan : integer;
                         plot : integer;
                         var est_xyz : vector_3d_type;
                         var best : integer);

var
    vec1 : vector_3d_type;
    vec2 : vector_3d_type;
    norm_pos : vector_3d_type;
    vec : vector_3d_type;
    new_pos : vector_3d_type;
    new_posa : vector_3d_type;
    new_posb : vector_3d_type;
    new_az1 : real;
    new_el1 : real;
    new_az2 : real;
    new_el2 : real;
    range : real;
    txt : str15;
    txt1,txt2,txt3 : str15;
    x1 : integer;
    x2 : integer;
    y1 : integer;
    y2 : integer;
    factor : real;
```

```
      dist : real;
      top_dp : real;

begin crank_los_vector(object_node^[platform1,scan,plot].dr.azi
muth, object_node^[platform1,scan,plot].dr.elevation, pos[platform1,scan],vel[platform1,scan], vel_x_pos[platform1,scan],guess_range_min,
                  vec1,vec2);
      pick_vector(vec1,vec2,vel[platform1,scan],vec);
      new_xyz(pos[platform1,scan],vec,new_pos);
      new_posa := new_pos;

transform(new_pos,pos[platform2,scan],vel[platform2,scan],
           vel_x_pos[platform2,scan],new_az1,new_el1);

crank_los_vector(object_node^[platform1,scan,plot].dr.azi
muth, object_node^[platform1,scan,plot].dr.elevation, pos[platform1,scan],vel[platform1,scan], vel_x_pos[platform1,scan],guess_range_max,
                  vec1,vec2);
      pick_vector(vec1,vec2,vel[platform1,scan],vec);
      new_xyz(pos[platform1,scan],vec,new_pos);
      new_posb := new_pos;
transform(new_pos,pos[platform2,scan],vel[platform2,scan],
           vel_x_pos[platform2,scan],new_az2,new_el2);
      if (platform1 = 1) then
        begin
          draw_new_points(new_az1,new_el1,2,x1,y1);
          draw_new_points(new_az2,new_el2,2,x2,y2);
          setcolor(white);
          line(x1,y1,x2,y2);
        end;

find_closest(new_az1,new_el1,new_az2,new_el2,platform2,sc
an,
                 best,factor,dist,top_dp);

compute_xyz(platform2,scan,guess_range_min,guess_range_max,
              factor,new_posa,new_posb,best,est_xyz);
    end;

procedure draw_lines;

var
    platform : integer;
    plot : integer;
    scan : integer;
```

```
         est_xyz12 : vector_3d_type;
         est_xyz21 : vector_3d_type;
         best12 : integer;
         best21 : integer;
         avg_xyz : vector_3d_type;

begin
        for scan := 1 to 3 do
          for plot := 1 to plot_count[1,scan] do
            begin
              estimate_xyz(1,2,scan,plot,est_xyz12,best12);
              estimate_xyz(2,1,scan,plot,est_xyz21,best21);
              avg_xyz[1] := (est_xyz12[1] + est_xyz21[1]) / 2;
              avg_xyz[2] := (est_xyz12[2] + est_xyz21[2]) / 2;
              avg_xyz[3] := (est_xyz12[3] + est_xyz21[3]) / 2;
              writeln(file_var2,'scan = ',scan : 1,' plot =
',plot : 3,
                      ' real x,y,z = ',
                      object_node^[1,scan,plot].state[1]:10:2,'
',
                      object_node^[1,scan,plot].state[2]:10:2,'
',
                      object_node^[1,scan,plot].state[3]:10:2);
              writeln(file_var2,'   best plat 2 = ',best12:3,
                      '   est x,y,z = ',est_xyz12[1]:10:2,' ',
',est_xyz12[2]:10:2,' ',
                      est_xyz12[3]:10:2);
              writeln(file_var2,'   best plat 1 = ',best21:3,
                      '   est x,y,z = ',est_xyz21[1]:10:2,'
',est_xyz21[2]:10:2,' ',
                      est_xyz21[3]:10:2);
              writeln(file_var2,'   AVERAGE X,Y,Z = ',
                      avg_xyz[1]:10:2,'    ',avg_xyz[2]:10:2,'
',avg_xyz[3]:10:2);
{             writeln(file_var2,'az1,el1 = ',new_az1:10:8,'
',new_el1:10:8,' ',
                      'az2,el2    = ',new_az2:10:8,'
',new_el2:10:8);
              writeln(file_var2,'plot    az,el   =
',object_node^[2,scan,plot].dr.azimuth:10:8,'  ',
object_node^[2,scan,plot].dr.elevation:10:8,'    dist =
',dist);
              writeln(file_var2,'best dp = ',top_dp);    }
            end;
        end;

begin
{ randomize;  }
  clrscr;
  make_header;
  get_start_info(infilename,start_time);
  new(object_node);
  new(object_nums);
  new(booster_launch_node);
  new(detect_array);
```

```
assign(file_var,infilename);
reset(file_var,1);
assign(file_var2,'spit.out');
rewrite(file_var2);
read_params(file_var);
clrscr;
init_video;
init_screen;
readln;
get_plots(file_var);
spit_detects;
str(memavail,temp);
setcolor(yellow);
outtextxy(482,155,'Memory = ' + temp);
setcolor(green);
str(plot_count[1,1]:1,txt);
outtextxy(482,60,txt + ' Scan 1 Plots');
setcolor(cyan);
str(plot_count[1,2]:1,txt);
outtextxy(482,70,txt + ' Scan 2 Plots');
setcolor(lightred);
str(plot_count[1,3]:1,txt);
outtextxy(482,80,txt + ' Scan 3 Plots');
setcolor(green);
str(plot_count[2,1]:1,txt);
outtextxy(482,287,txt + ' Scan 1 Plots');
setcolor(cyan);
str(plot_count[2,2]:1,txt);
outtextxy(482,297,txt + ' Scan 2 Plots');
setcolor(lightred);
str(plot_count[2,3]:1,txt);
outtextxy(482,307,txt + ' Scan 3 Plots');
done := false;
while not done do
  begin
    c := readkey;
    case c of
      'P','p' : draw_plots;
      'L','l' : draw_lines;
      'Q','q' : done := true;
    end;
  end;
restorecrtmode;
close(file_var2);
clrscr;
end.
```

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A method for analyzing electromagnetic radiation from each of a plurality of objects to determine the positions of the objects relative to a predetermined reference point, comprising the steps of:

(a) sensing each object using a first sensor whose position relative to the predetermined reference point is known, the first sensor sensing electromagnetic radiation from each object and providing first angular data defining first lines-of-sight from the first sensor to the respective objects;

(b) sensing each object using a second sensor whose position relative to the predetermined reference point is known, the second sensor sensing electromagnetic radiation from each object and providing second angular data defining second lines-of-sight from the second sensor to the respective objects, said first and second sensors sensing objects over respective angular ranges that include locations at which the angle with respect to the first sensor is greater than the angle with respect to the second sensor, and locations at which the angle with respect to the first sensor is less than the angle with respect to the second sensor;

(c) determining, for each object, a distance range line along its respective first line-of-sight from a predetermined minimum range to a predetermined maximum range independent of the relative intensities of electromagnetic radiation sensed by each sensor from said object;

(d) converting the range line for each object relative to the first sensor to range line coordinates relative to the second sensor independent of the relative intensities of electromagnetic radiation sensed by each sensor from each object;

(e) matching the respective second angular data for each object to said range line coordinates for the respective object independent of the relative intensities of electromagnetic radiation sensed by each sensor from each other;

(f) determining, for each object relative to the second sensor and independent of the relative intensities of electromagnetic radiation sensed by each sensor from each object, a position point which corresponds to the closest approach of its respective second line-of-sight to its respective range line; and (g) determining, for each object relative to the predetermined reference point and independent of the relative intensities of electromagnetic radiation sensed by each sensor from each object, coordinates of its respective position point;

said coordinates of the respective position points relative to the predetermined reference point specifying said positions of the respective objects relative to the reference point.

2. A method as in claim 1, in which step (e) comprises matching the second angular data for each object to said range line coordinates for the respective object using a basic feasible solution algorithm.

3. A method as in claim 1, in which step (e) comprises the substeps, for each object, of:

(h) calculating a perpendicular distance from the respective second line-of-sight to each of the range lines; and (i) matching the respective second angular data to the range line for which said calculated perpendicular distance is minimum.

4. A method as in claim 1, in which step (e) comprises matching said second angular data for each object to said range line coordinates for the respective object using a global optimization algorithm.

5. A method as in claim 4, in which the global optimization algorithm is the Munkres Assignment Problem Algorithm.

6. A method as in claim 1, in which step (f) comprises calculating, for each object, its respective position point as the intersection of its respective range line with a line which perpendicularly intersects its respective range line and its respective second line-of-sight.

7. A method for analyzing electromagnetic radiation from each of a plurality of objects to determine the three-dimensional coordinates of the object relative to a predetermined reference point, comprising the steps of:

(a) sensing each object using a first sensor whose three-dimensional coordinates relative to the predetermined reference point are known, the first sensor sensing electromagnetic radiation from each object and providing first azimuth and elevation coordinates defining first lines-of-sight from the first sensor to the respective objects;

(b) sensing each object using a second sensor whose three-dimensional coordinates relative to the predetermined reference point are known, the second sensor sensing electromagnetic radiation from each object and providing second azimuth and elevation coordinates defining second lines-of-sight from the second sensor to the respective objects, said first and second sensors sensing objects over respective elevation ranges that include locations at which the elevation with respect to the first sensor is greater than the elevation with respect to the second sensor, and locations at which the elevation with respect to the first sensor is less than the elevation with respect to the second sensor;

(c) determining for each object, as a predetermined function of the respective first azimuth and elevation coordinates and said three-dimensional coordinates of the first sensor relative to the predetermined reference point, first three-dimensional coordinates relative to the first sensor of minimum and maximum endpoints of a distance range line coincident with the respective first line-of-sight and independent of the relative intensities of electromagnetic radiation sensed by each sensor from said object, the minimum endpoint being a predetermined minimum range from the first sensor and the maximum endpoint being a predetermined maximum range from the first sensor;

(d) determining for each object, independent of the relative intensities of electromagnetic radiation sensed by each sensor from each object and as a predetermined function of (1) said first three-dimensional coordinates of the minimum and maximum endpoints of the respective range line, (2) said three-dimensional coordinates of the first sensor relative to the predetermined reference point and (3) said three-dimensional coordinates of the second sensor relative to the predetermined reference point, second three-dimensional coordinates relative to the second sensor of the minimum and maximum endpoints of the respective range line;

(e) matching the respective second azimuth and elevation coordinates for each object to said second three-dimensional coordinates of the minimum and maximum endpoints of the range line for the respective object independent of the relative intensities of electromagnetic radiation sensed by each sensor from each object;

(f) determining for each object, as a predetermined function of the respective second azimuth and elevation coordinates and said second three-dimensional coordinates of the minimum and maximum endpoints of the respective range line, and independent of the relative intensities of electromagnetic radiation sensed by each sensor from each object, first three-dimensional coordinates relative to the second sensor of a position point which corresponds to the closest approach of its respective second line-of-sight to its respective range line; and (g) determining for each object, as a predetermined function of said first three-dimensional coordinates of its respective position point and said three-dimensional coordinates of the second sensor relative to the predetermined reference point and independent of the relative intensities of electromagnetic radiation sensed by each sensor from each object, second three-dimensional coordinates relative to the predetermined reference point of its respective position point;

said second three-dimensional coordinates of the respective position points specifying said positions of the respective objects relative to the predetermined reference point.

8. A method as in claim 7, in which step (e) comprises matching the respective second azimuth and elevation coordinates of each object to said second three-dimensional coordinates of the minimum and maximum endpoints of the respective range line using a basic feasible solution algorithm.

9. A method as in claim 7, in which step (e) comprises the substeps, for each object, of:
   (h) calculating a perpendicular distance from the respective second line-of-sight to each of the range lines; and
   (i) matching the respective second azimuth and elevation coordinates to the second three-dimensional coordinates of the minimum and maximum endpoints of the respective range line for which said calculated perpendicular distance is minimum.

10. A method as in claim 7, in which step (e) comprises matching the respective second azimuth and elevation coordinates of each object to said second three-dimensional coordinates of the minimum and maximum endpoints of the respective range line using a global optimization algorithm.

11. A method as in claim 10, in which the global optimization algorithm is the Munkres Assignment Problem Algorithm.

12. A method as in claim 7, in which step (f) comprises calculating, for each object, its respective position point as the intersection of its respective range line with a line which perpendicularly intersects its respective range line and its respective second line-of-sight.

13. An apparatus for analyzing electromagnetic radiation from each of a plurality of objects to determine the positions of the objects relative to a reference point, comprising:
   a first sensor whose position relative to the predetermined reference point is known for sensing electromagnetic radiation from each of the objects and providing first angular data defining first lines-of-sight from the first sensor to each respective object;
   a second sensor whose position relative to the predetermined reference point is known for sensing electromagnetic radiation from each of the objects and providing second angular data defining second lines-of-sight from the second sensor to each respective object, said first and second sensors sensing objects over respective angular ranges that include locations at which the angle with respect to the first sensor is greater than the angle with respect to the second sensor, and locations at which the angle with respect to the first sensor is less than the angle with respect to the second sensor;
   first parallel processing means for simultaneously determining, for each object, a distance range line along its respective first line-of-sight from a predetermined minimum range to a predetermined maximum range independent of the relative intensities of electromagnetic radiation sensed by each sensor from said object;
   second parallel processing means for simultaneously converting the range line for each object relative to the first sensor means to range line coordinates relative to the second sensor independent of the relative intensities of electromagnetic radiation sensed by each sensor from each object;
   third parallel processing means for simultaneously matching the respective second angular data for each object to said range line coordinates for the respective object independent of the relative intensities of electromagnetic radiation sensed by each sensor from each object;
   fourth parallel processing means for simultaneously determining, for each object relative to the second sensor and independent of the relative intensities of electromagnetic radiation sensed by each sensor from each object, a position point which corresponds to the closest approach of its respective second line-of-sight to its respective range line; and
   fifth parallel processing means for simultaneously determining, for each object, coordinates relative to the predetermined reference point of its respective position point;

said coordinates of the respective position points relative to the predetermined reference point specifying said positions of the respective objects relative to the predetermined reference point.

14. An apparatus as in claim 13, in which the first to fifth parallel processing means are integral and comprise, in combination, a single instruction stream—multiple data stream (SIMD) computing means including an operating program temporarily stored in volatile memory.

15. An apparatus as in claim 13, in which the first to fifth parallel processing means are integral and comprise, in combination, a single instruction stream—multiple data stream (SIMD) computing means including an operating program permanently stored in non-volatile memory.

16. An apparatus as in claim 13, in which said first to fifth parallel processing means are integral and comprise, in combination, a single instruction stream—multiple data stream (SIMD) computing means including:
   a main processing element including:
      computing means;
      main program storage means for storing main program data including instructions for simultaneous execution by the first to fifth parallel processing means; and
      main data storage means for storing data including said positions of the first and second sensors relative to the predetermined reference point;
   a plurality of parallel processing elements for processing data associated with the objects respectively; and
   bus line means for interconnecting the main processing element with each of the parallel processing elements such that instructions generated by the main processing element are simultaneously executed by all of the parallel processing elements in parallel;
   each parallel processing element including:
      computing means for executing said instructions from the main processing means;
      parallel program storage means for storing program data which implements the functions of said first to fifth parallel processing means; and
      parallel data storage means for storing data associated with the respective object.

17. An apparatus as in claim 16, in which the parallel program storage means of each parallel processing element includes a non-volatile memory for permanently storing said program data.

* * * * *